(12) United States Patent
Bakker et al.

(10) Patent No.: US 11,375,355 B2
(45) Date of Patent: *Jun. 28, 2022

(54) METHODS AND SYSTEMS FOR PROVISIONING EMERGENCY NUMBERS

(71) Applicant: BlackBerry Limited, Waterloo (CA)

(72) Inventors: Jan Hendrik Lucas Bakker, Fort Worth, TX (US); Nicholas James Russell, Newbury (GB)

(73) Assignee: BlackBerry Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/064,336

(22) Filed: Oct. 6, 2020

(65) Prior Publication Data

US 2021/0021982 A1 Jan. 21, 2021

Related U.S. Application Data

(63) Continuation of application No. 16/745,167, filed on Jan. 16, 2020, now Pat. No. 10,834,565, which is a (Continued)

(51) Int. Cl.
*H04W 4/90* (2018.01)
*H04L 29/06* (2006.01)
(Continued)

(52) U.S. Cl.
CPC ........... *H04W 4/90* (2018.02); *H04L 65/1006* (2013.01); *H04L 65/1016* (2013.01);
(Continued)

(58) Field of Classification Search
CPC .. H04W 4/90; H04L 65/1006; H04L 65/1016; H04L 65/1069
See application file for complete search history.

(56) References Cited

U.S. PATENT DOCUMENTS 9,467,906 B2 10/2016 Wong et al.
10,349,257 B1 7/2019 Bakker et al.
(Continued)

FOREIGN PATENT DOCUMENTS

EP 3076691 A1 10/2016
EP 2454895 B1 8/2017
(Continued)

OTHER PUBLICATIONS

3GPP TS 23.003 V15.2.0; 3rd Generation Partnership Project; Technical Specification Group Core Network and Terminals; Numbering, Addressing and Identification; Release 15; Dec. 2017; 116 pages.
(Continued)

*Primary Examiner* — Christopher M Brandt
(74) *Attorney, Agent, or Firm* — Conley Rose, P. C.; J. Robert Brown, Jr.

(57) ABSTRACT

There is provided a method and device for provisioning emergency number information on a user equipment. When a dialed number matches an emergency number from the provisioned emergency number information, the user equipment selects either the circuit switched domain or the packet switched domain and executes a call setup procedure for that domain.

11 Claims, 15 Drawing Sheets

Related U.S. Application Data continuation of application No. 16/538,414, filed on Aug. 12, 2019, now Pat. No. 10,674,345, which is a continuation of application No. 16/408,144, filed on May 9, 2019, now Pat. No. 10,440,549, which is a continuation of application No. 16/044,216, filed on Jul. 24, 2018, now Pat. No. 10,349,257.

(60) Provisional application No. 62/611,992, filed on Dec. 29, 2017.

(51) Int. Cl.
  *H04L 65/1069*   (2022.01)
  *H04L 65/1016*   (2022.01)
  *H04L 65/10*     (2022.01)
  *H04L 65/1073*   (2022.01)
  *H04W 84/04*     (2009.01)

(52) U.S. Cl.
  CPC ...... *H04L 65/1069* (2013.01); *H04L 65/1073* (2013.01); *H04W 84/042* (2013.01)

(56) References Cited

U.S. PATENT DOCUMENTS

| | | | |
|---|---|---|---|
| 10,440,549 B2 | 10/2019 | Bakker et al. | |
| 10,674,345 B2 | 6/2020 | Bakker et al. | |
| 2007/0060097 A1* | 3/2007 | Edge | H04L 65/4007 455/404.1 |
| 2009/0047922 A1 | 2/2009 | Buckley et al. | |
| 2010/0014508 A1* | 1/2010 | Yang | H04M 7/0057 370/352 |
| 2010/0056101 A1* | 3/2010 | Poikselka | H04W 4/029 455/404.2 |
| 2011/0032931 A1* | 2/2011 | Zhu | H04L 65/1016 370/357 |
| 2011/0099281 A1* | 4/2011 | Bakker | H04L 65/1016 709/228 |
| 2011/0189971 A1* | 8/2011 | Faccin | H04W 76/10 455/404.1 |
| 2015/0063227 A1* | 3/2015 | Chaponniere | H04M 7/0057 370/329 |
| 2015/0078208 A1* | 3/2015 | Bakker | H04L 63/0407 370/259 |
| 2016/0100435 A1* | 4/2016 | Bakker | H04W 4/90 455/404.1 |
| 2017/0366955 A1* | 12/2017 | Edge | H04M 11/04 |
| 2018/0191786 A1* | 7/2018 | Kunz | H04L 65/1073 |
| 2020/0154259 A1 | 5/2020 | Bakker et al. | |

FOREIGN PATENT DOCUMENTS

| | | | |
|---|---|---|---|
| WO | 2011088066 A1 | 7/2011 | |
| WO | 2013172680 A1 | 11/2013 | |
| WO | 2017001640 A1 | 1/2017 | |
| WO | 2017174014 A1 | 10/2017 | |

OTHER PUBLICATIONS

3GPP TS 23.038 V14.0.0; 3rd Generation Partnership Project; Technical Specification Group Core Network and Terminals; Alphabets and Language-Specific Information; Release 14; Mar. 2017; 56 pages.
3GPP TS 23.501 V15.0.0; 3rd Generation Partnership Project; Technical Specification Group Services and System Aspects; System Architecture for the 5G System; Stage 2; Release 15; Dec. 2017; 181 pages.
3GPP TS 24.008 V15.0.0; 3rd Generation Partnership Project; Technical Specification Group Core Network and Terminals; Mobile Radio Interface Layer 3 Specification; Core Network Protocols; Stage 3; Release 15; Sep. 2017; 782 pages.
3GPP TS 24.229 V15.0.0; 3rd Generation Partnership Project; Technical Specification Group Core Network and Terminals; IP Multimedia Call Control Protocol based on Session Initiation Protocol (SIP) and Session Description Protocol (SDP); Stage 3; Release 15; Sep. 2017; 987 pages.
3GPP TS 44.006 V14.0.0; 3rd Generation Partnership Project; Technical Specification Group Radio Access Network; Mobile Station—Base Station System (MS—BSS) Interface; Data Link (DL) Layer Specification; Release 14; Mar. 2017; 60 pages.
Harrenstien, K., et al.; "DOD Internet Host Table Specification"; RFC 952; Oct. 1985; 6 pages.
Internet Engineering Task Force; "Requirements for Internet Hosts—Application and Support"; RFC 1123 Oct. 1989; 98 pages.
Schulzrinne, H.; "A Uniform Resource Name (URN) for Emergency and Other Well-Known Services"; RFC 5031; Jan. 2008; 15 pages.
Deutsche Telekom; "Implementation Options for Providing sos-URNs"; C1-173895; 3GPP TSG CT WG1 Meeting #107; Kochi, India; Oct. 23-27, 2017; 5 pages.
Deutsche Telekom; "IE Proposal for Emergency Number with Associated sos URN"; C1-174829; 3GPP TSG CT WG1 Meeting #107; Reno, USA; Nov. 27-Dec. 1, 2017; 7 pages.
Blackberry UK Ltd.; "Handling of Local Emergency Numbers Issues (alt 2)"; C1-174732; 3GPP TSG-CT WG1 Meeting #107; Reno, USA; Nov. 27-Dec. 1, 2017; 9 pages.
Qualcomm Inc.; "Treatment of a 380 Response for an Undetected IMS Emergency Call"; S2-133316; SA WG2 Meeting #99; Xiamen, P.R. China; Sep. 23-27, 2017; 6 pages.
Blackberry UK Ltd.; "Handling of Local Emergency Numbers Issues"; C1-174711; 3GPP TSG-CT WG1 Meeting #107; Reno, USA; Nov. 27-Dec. 1, 2017; 3 pages.
Office Action dated Jan. 9, 2019; U.S. Appl. No. 16/044,216, filed Jul. 24, 2018; 24 pages.
Notice of Allowance dated Apr. 11, 2019; U.S. Appl. No. 16/044,216, filed Jul. 24, 2018; 9 pages.
Notice of Allowance dated Jul. 1, 2019; U.S. Appl. No. 16/408,144, filed May 9, 2019; 15 pages.
Notice of Allowance dated Oct. 17, 2019; U.S. Appl. No. 16/538,414, filed Aug. 12, 2019; 16 pages.
Office Action dated Feb. 19, 2020; U.S. Appl. No. 16/745,167, filed Jan. 16, 2020; 24 pages.
Notice of Allowance dated Jun. 29, 2020; U.S. Appl. No. 16/745,167, filed Jan. 16, 2020; 13 pages.
PCT International Search Report; Application No. PCT/US18/43519; dated Oct. 1, 2018; 2 pages.
PCT Written Opinion of the International Searching Authority; Application No. PCT/US18/43519; dated Oct. 1, 2018; 5 pages.
Canadian Office Action; Application No. 3,067,888; dated Jan. 30, 2020; 5 pages.
Canadian Office Action; Application No. 3,067,888; dated Jul. 6, 2020; 4 pages.
Chinese Office Action; Application No. 201880056950.2; dated Jul. 3, 2020; 13 pages.
Chinese Office Action as Received in Co-pending Application No. 201880056950.2; dated Dec. 9, 2020; 9 pages. (No English translation available).
Japanese Office Action as Received in Co-pending Application No. 2020-516455 dated Aug. 4, 2020; 2 pages. (No English translation available).
Japanese Office Action as Received in Co-pending Application No. 2020-516455 dated Nov. 25, 2020; 2 pages. (No English translation available).
Chinese Office Action; Application No. 201880056950.2; dated Mar. 12, 2021; 8 pages.
Indian Office Action; Application No. 201947054725; dated Sep. 10, 2021; 6 pages.

\* cited by examiner

| 8 | 7 | 6 | 5 | 4 | 3 | 2 | 1 | |
|---|---|---|---|---|---|---|---|---|
| colspan="8" | Emergency Number List IEI | octet 1 |
| colspan="8" | Length of Emergency Number List IE contents | octet 2 |
| colspan="8" | Length of 1st Emergency Number information (Note 1) | octet 3 |
| colspan="3" | Spare 0 0 0 | colspan="5" | Emergency Service Category Value | octet 4 |
| colspan="4" | Number digit 2 | colspan="4" | Number digit 1 | octet 5 (Note 2) |
| colspan="4" | Number digit 4 | colspan="4" | Number digit 3 | octet 6* |
| colspan="4" | : | colspan="4" | : | : |
| colspan="4" | (Note 3) | colspan="4" | | octet j-1* |
| colspan="8" | Length of 2nd Emergency Number information (Note 1) | octet j* |
| colspan="3" | Spare 0 0 0 | colspan="5" | Emergency Service Category Value | octet j+1* |
| colspan="4" | Number digit 2 | colspan="4" | Number digit 1 | octet j+2* (Note 2) |
| colspan="4" | Number digit 4 | colspan="4" | Number digit 3 | octet j+3* |
| colspan="4" | : | colspan="4" | : | : |
| colspan="4" | (Note 3) | colspan="4" | : | octet j+k* |
| colspan="8" | . . . | . . . |
| colspan="8" | Length of xth Emergency Number information (Note 1) | octet n* |
| colspan="3" | Spare 0 0 0 | colspan="5" | Emergency Service Category Value | octet n+1* |
| colspan="4" | Number digit 2 | colspan="4" | Number digit 1 | octet n+2* (Note 2) |
| colspan="4" | Number digit 4 | colspan="4" | Number digit 3 | octet n+3* |
| colspan="4" | : | colspan="4" | : | : |
| colspan="4" | (Note 3) | colspan="4" | : | octet n+m* |

FIG. 6

| 8 | 7 | 6 | 5 | 4 | 3 | 2 | 1 | |
|---|---|---|---|---|---|---|---|---|
| | Service Category IEI ||||||| octet 1 |
| Length of Service Category |||||||| octet 2 |
| 0 Spare | Emergency Service Category Value ||||||| octet 3 |

FIG. 7

| 8 | 7 | 6 | 5 | 4 | 3 | 2 | 1 | |
|---|---|---|---|---|---|---|---|---|
| Emergency Information IE ||||||||  octet 1 |
| Length of Emergency Information IE contents |||||||| octet 2 |
| MCC digit 2 |||| MCC digit 1 |||| octet 3 |
| spare 0 | Coding scheme ||| MCC digit 3 |||| octet 4 |
| spare 0 | Country character 1 (Note 0) ||||||| octet 5 |
| spare 0 | Country character 2 (Note 0) ||||||| |
| spare 0 0 0 |||| Emergency Service Category Value |||| |
| CSE | Length of 1st emergency number (Note 1) ||||||| |
| Number digit 2 |||| Number digit 1 |||| |
| Number digit 4 |||| Number digit 3 |||| |
| : |||| : |||| |
| (Note 3) |||||||| |
| CSEU | Length of 1st URI's last emergency label (Note 4) ||||||| |
| Label character 1 (Note 0) |||||||| |
| Label character 2 (Note 0) |||||||| |
| : |||||||| |
| Label character y (Note 0) |||||||| |
| spare 0 0 0 |||| Emergency Service Category Value |||| |
| CSE | Length of 2nd emergency number (Note 1) ||||||| |
| Number digit 2 |||| Number digit 1 |||| |
| Number digit 4 |||| Number digit 3 |||| |
| : |||| : |||| |
| (Note 3) |||||||| |
| CSEU | Length of 2nd URI's last emergency label (Note 4) ||||||| |

FIG. 8A

| | |
|---|---|
| Label character 1 (Note 0) | |
| Label character 2 (Note 0) | |
| : | |
| Label character y (Note 0) | |
| : | |
| spare 0 0 0 | Emergency Service Category Value |
| CSE | Length of Xth emergency number (Note 1) |
| Number digit 2 | Number digit 1 |
| Number digit 4 | Number digit 3 |
| : | : |
| (Note 3) | |
| CSEU | Length of Xth URI's last emergency label (Note 4) |
| Label character 1 (Note 0) | |
| Label character 2 (Note 0) | |
| : | |
| Label character y (Note 0) | |

FIG. 8B

| 8 | 7 | 6 | 5 | 4 | 3 | 2 | 1 | |
|---|---|---|---|---|---|---|---|---|
| Emergency Information IE ||||||||  octet 1 |
| Length of Emergency Information IE contents |||||||| octet 2 |
| MCC digit 2 |||| MCC digit 1 |||| octet 3 |
| spare 0 | Coding scheme ||| MCC digit 3 |||| octet 4 |
| spare 0 | B7 1 | B6 0 || Country character 1 (Note 0) |||| octet 5 |
| spare 0 | B7 1 | B6 0 || Country character 2 (Note 0) |||| octet 6(+1) |
| CSE || Length of 1st emergency information (Note 1) |||||| octet 7(+2) |
| spare 0 0 0 |||| Emergency Service Category Value |||| octet 8(+2) |
| Number digit 2 |||| Number digit 1 |||| octet 9(+2) (Note 2) |
| Number digit 4 |||| Number digit 3 |||| octet 10(+2)* |
| : |||| : |||| : |
| (Note 3) |||||||| octet j-1* |
| CSE || Length of 2nd emergency information (Note 1) |||||| octet j* |
| spare 0 0 0 |||| Emergency Service Category Value |||| octet j+1 |
| Number digit 2 |||| Number digit 1 ||||  |
| Number digit 4 |||| Number digit 3 ||||  |
| : |||| : ||||  |
| (Note 3) |||||||| octet j+k* |
| : ||||||||  |
| CSE || Length of Xth emergency information (Note 1) |||||| octet n* |

FIG. 9A

| Number digit 2 | Number digit 1 | octet n+1 |
|---|---|---|
| Number digit 4 | Number digit 3 | |
| : | : | |
| (Note 3) | | octet n+m* |

FIG. 9B

| 8 | 7 | 6 | 5 | 4 | 3 | 2 | 1 | |
|---|---|---|---|---|---|---|---|---|
| Emergency Information IE ||||||||octet 1|
| Length of Emergency Information IE contents ||||||||octet 2|
| MCC digit 2 |||| MCC digit 1 ||||octet 3|
| spare 0 | Coding scheme ||| MCC digit 3 ||||octet 4|
| spare 0 | B7 1 | B6 0 | Country character 1 (Note 0) |||||octet 5|
| spare 0 | B7 1 | B6 0 | Country character 2 (Note 0) ||||||
| CSE | CSEU || Length of 1st URI's last emergency label (Note 4) |||||
| Label character 1 (Note 0) ||||||||
| Label character 2 (Note 0) ||||||||
| : ||||||||
| Label character y (Note 0) ||||||||
| CSE | CSEU || Length of 2nd URI's last emergency label (Note 4) |||||
| spare 0 0 0 |||| Emergency Service Category Value |||||
| Label character 1 (Note 0) ||||||||
| Label character 2 (Note 0) ||||||||
| : ||||||||
| Label character y (Note 0) ||||||||
| : ||||||||
| CSE | CSEU || Length of Xth URI's last emergency label (Note 4) |||||
| Label character 1 (Note 0) ||||||||
| Label character 2 (Note 0) ||||||||
| : ||||||||
| Label character y (Note 0) ||||||||

FIG. 10

19.4.2.9A.x    Emergency Numbers FQDN

The Emergency Numbers FQDN shall be constructed as specified for the Visited Country Emergency FQDN in subclause 19.4.2.9A.4, but with replacing the label:
- "epdg" by the label "en"; and

- "epc" by the label "cn".

The result of the Emergency Numbers FQDN will be:
"sos.en.cn.mcc<MCC>.pub.3gppnetwork.org"

As an example, the Emergency Numbers FQDN for MCC 345 is coded in the DNS as:
"sos.en.cn.mcc345.pub.3gppnetwork.org".

19.4.2.9A.x    Replacement field used in DNS-based Discovery of Emergency Numbers, Categories and Types The NAPTR record(s) associated to the Emergency Numbers FQDN shall be provisioned with the replacement field containing the emergency numbers, related categories (if any) and emergency service types.
The replacement field shall take the following form and include both an emergency number, an emergency service type, and indication whether the number should trigger an emergency call on CS domain or not, and an optional category:
<ps-emergency-type>.<cs-emergency >.<emergency-number>.sos.en.cn.mcc<MCC>.pub.3gppnetwork.org The <emergency-number>, <ps-emergency-type> and <cs-emergency > shall follow the syntax defined in Table 19.4.2.9A.x-1. The <emergency-number> shall consist of a single label. The <ps-emergency-type> shall consist of at least one label. The <cs-emergency> shall consist of a single label.

Table 19.4.2.9A.x-1: Syntax of emergency number, CS emergency and PS emergency type

```
emergency-number   = DIGIT*DIGIT                          ; at least one DIGIT
cs-emergency       = "cs" / "ecs" 5 bit
ps-emergency-type  = "sos" *("." sub-label)
sub-label          = let-dig [ *let-dig-hyp let-dig ]
let-dig-hyp        = let-dig / "-"
let-dig            = ALPHA / DIGIT
bit                = "0" / "1"
ALPHA              = %x41-5A / %x61-7A                    ; A-Z / a-z
```

As an example, the NAPTR records associated to the Country based Emergency Numbers FQDN for MCC 345 are provisioned in the DNS as:
sos.en.cn.mcc345.pub.3gppnetwork.org

FIG. 11A

```
;    IN NAPTR order   pref.      flag service regexp replacement
IN NAPTR    100     999     ""          ""
sos.ambulance.cs.15.sos.en.cn.mcc345.pub.3gppnetwork.org
IN NAPTR    100     999     ""          ""
sos.police.ecs00001.17.sos.en.cn.mcc345.pub.3gppnetwork.org
IN NAPTR 100    999     ""          ""
sos.fire.18.ecs00100.sos.en.cn.mcc345.pub.3gppnetwork.org
IN NAPTR 100    999     ""          ""
sos.marine.cs.196.sos.en.cn.mcc345.pub.3gppnetwork.org
```

FIG. 11B

Table 19.4.2.9A.x-1: Syntax of emergency number, CS emergency and PS emergency type

```
emergency-number  = DIGIT*DIGIT              ; at least one
DIGIT
cs-emergency      = "cs" / "ecs" bit hex-digit
ps-emergency-type = "sos" *("." sub-label)
sub-label         = let-dig [ *let-dig-hyp let-dig ]
let-dig-hyp       = let-dig / "-"
let-dig           = ALPHA / DIGIT
bit               = "0" / "1"
hex-digit         = DIGIT / %x41-46 / %x61-66 ; 0-9 / a-f /
                    A-F
ALPHA             = %x41-5A / %x61-7A         ; A-Z / a-z
```

As an example, the NAPTR records associated to the Country based Emergency Numbers FQDN for MCC 345 are provisioned in the DNS as:
sos.en.cn.mcc345.pub.3gppnetwork.org
;     IN NAPTR order    pref.       flag service regexp  replacement
IN NAPTR     100    999     ""             ""
sos.ambulance.cs.15.sos.en.cn.mcc345.pub.3gppnetwork.org
IN NAPTR     100    999     ""             ""
sos.police.ecs01.17.sos.en.cn.mcc345.pub.3gppnetwork.org
IN NAPTR 100    999     ""          ""
sos.fire.18.ecs04.sos.en.cn.mcc345.pub.3gppnetwork.org
IN NAPTR 100    999     ""          ""
sos.marine.cs.196.sos.en.cn.mcc345.pub.3gppnetwork.org

FIG. 12

METHODS AND SYSTEMS FOR PROVISIONING EMERGENCY NUMBERS

CROSS-REFERENCE TO RELATED APPLICATIONS

This application is a continuation of U.S. patent application Ser. No. 16/745,167 filed Jan. 16, 2020, which is a continuation of U.S. Pat. No. 10,674,345 issued on Jun. 2, 2020, which is a continuation of U.S. Pat. No. 10,440,549 issued on Oct. 8, 2019, which is a continuation of U.S. Pat. No. 10,349,257, issued on Jul. 9, 2019, which claims priority to U.S. Provisional Application No. 62/611,992 filed Dec. 29, 2017 by Jan Hendrik Lucas Bakker, et al. entitled, "Methods and Systems for Provisioning Emergency Numbers", all of which are incorporated by reference herein as if reproduced in their entirety.

FIELD OF THE DISCLOSURE

The present disclosure relates to methods and systems for provisioning emergency numbers on a wireless device.

BACKGROUND

Telecommunication services are offered via Public Land Mobile Networks (PLMNs) to a user equipment (UE). A user may operate the UE. A PLMN is typically subdivided into an access network, a core network and an Internet Protocol (IP) Multimedia Subsystem (IMS). Services are typically provided by a user's home network. When the user is using a non-home network, the visited network may have a relation with the user's home network. Some communications transmitted by the UE are communicated all the way back to the home network, via the visited network.

These communications may take different routes, travel through different network elements based on for example the type of relationship between the home network and the visited network, or based on the technology of the networks. For example, a 5$^{th}$Generation (5G) core network has different network elements compared to an Enhanced Packet Core (EPC) network.

The IMS may comprise a Proxy Call Session Control Function (P-CSCF). The EPC may comprise a Mobility Management Entity (MME) or a Packet Data Network (PDN) Gateway (GW), and the 5G Core Network (CN) may comprise an Access and Mobility Management Function (AMF) or User Plane Function (UPF). A CN supports the IMS.

Networks may offer a Circuit Switched (CS) domain, where traditionally voice calls and emergency calls are handled, or a Packet Switched (PS) domain, offering PS services including access to the IMS.

The PS domain supports emergency services via the IMS. A UE may support accessing one or both of the CS domain and PS domain. A UE able to access the PS domain may also support accessing the IMS.

When an emergency call attempt is not detected as such by the UE on the PS domain, the UE may be redirected. Several forms of redirection exist and some of them may occur in a sequence. When an undetected emergency call attempt is redirected, the UE needs to retry the call using emergency procedures. The redirection and retrying is time consuming and may cause the user to terminate the call attempt. These problems are only exacerbated if the user subsequently retries the emergency call.

BRIEF DESCRIPTION OF THE DRAWINGS

The present disclosure will be better understood with reference to the drawings, in which:

FIG. 6 is a table showing figure 10.5.84c of 3GPP TS 24.008.

FIG. 7 is a table showing figure 10.5.118d of 3GPP TS 24.008.

FIGS. 8A and 8B are a table showing an Emergency Number List information element coding, where FIG. 8B flows from FIG. 8A.

FIGS. 9A and 9B are a table showing an Emergency Number List information element coding, where FIG. 9B flows from FIG. 9A.

FIG. 10 is a table showing an Emergency Number List Information Element.

FIGS. 11A and 11B are a table showing emergency number FQDN based on the Emergency Numbers FQDN format as specified in 3GPP TS 23.003, where FIG. 11B flows from FIG. 11A.

FIG. 12 is a table showing a Syntax of emergency number, CS emergency and PS emergency type.

DETAILED DESCRIPTION OF THE DRAWINGS

Figure 1:
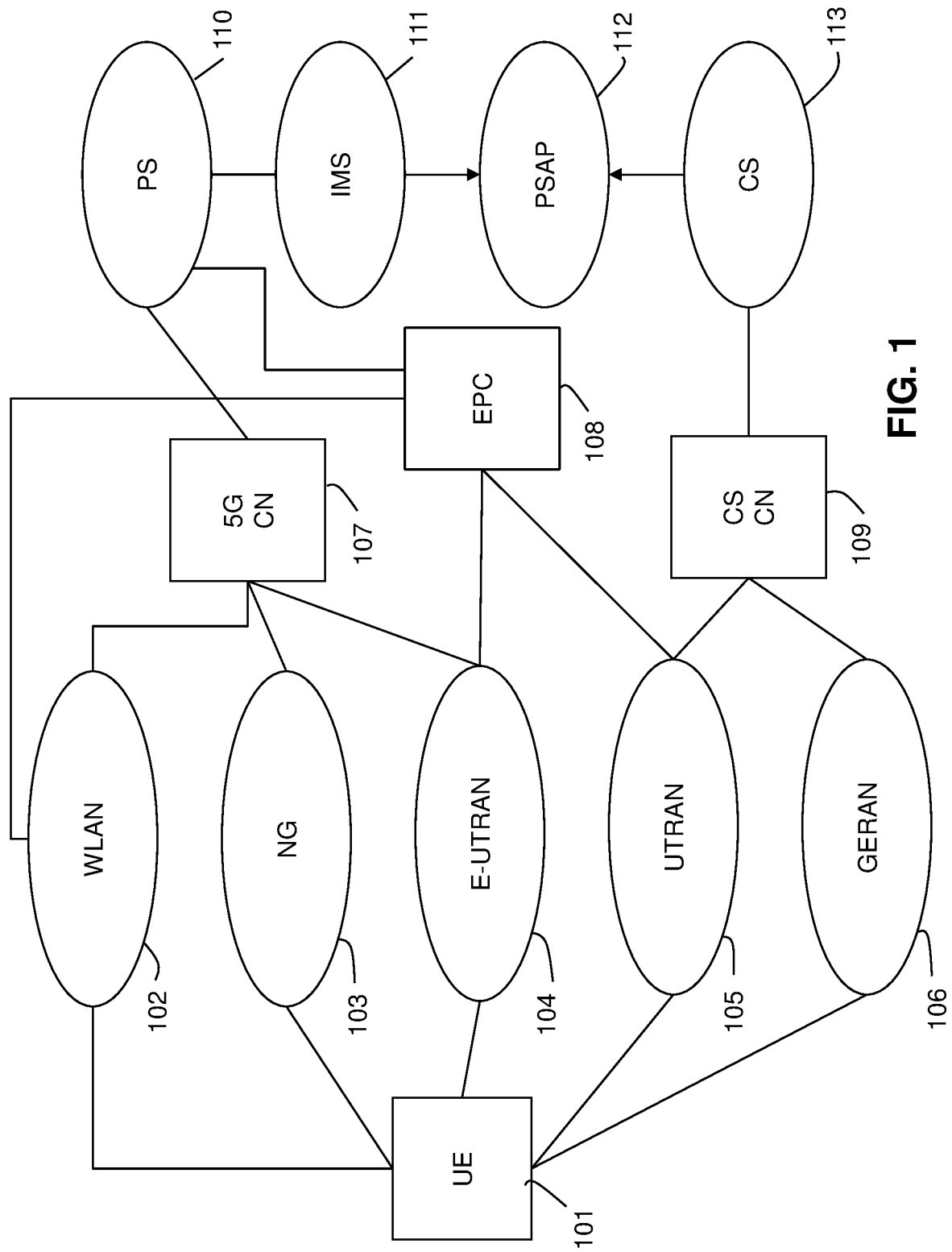
FIG. 1 is a diagram illustrating various communication paths between for messages from a UE to a Public Safety Access Point.

According to at least one embodiment of the present disclosure, there is provided a method by a User Equipment (UE) for using emergency information, comprising transmitting a request message as part of a Network Access Stratum (NAS) procedure; receiving, in response to the request message, a response message comprising a list of at least one emergency number; determining that a dialed number matches the at least one emergency number; when determining that the dialed number matches the at least one emergency number, selecting a domain to perform a call setup procedure, wherein the call setup procedure comprises at least one of a basic call setup procedure and an emergency call setup procedure; when the selected domain is a Packet Switched (PS) domain, performing an emergency call setup procedure; and when the selected domain is a Circuit Switched (CS) domain, performing a basic call setup procedure.

According to at least another embodiment of the present disclosure, there is provided a User Equipment (UE) comprising: a processor; and a communications subsystem; wherein the processor and the communications subsystem cooperate to: transmit a request message as part of a Network Access Stratum (NAS) procedure; receive, in response to the request message, a response message comprising a list of at least one emergency number; determine that a dialed number matches the at least one emergency number; when determining that the dialed number matches the at least one emergency number, select a domain to perform a call setup procedure, wherein the call setup procedure comprises at least one of a basic call setup procedure and an emergency call setup procedure; when the selected domain is a Packet Switched (PS) domain, perform an emergency call setup procedure; and when the selected domain is a Circuit Switched (CS) domain, perform a basic call setup procedure.

According to at least another embodiment of the present disclosure, there is provided a non-transitory computer readable medium having stored thereon executable code for execution by a processor of a User Equipment (UE), the executable code comprising instructions for: transmitting a request message as part of a Network Access Stratum (NAS) procedure; receiving, in response to the request message, a response message comprising a list of at least one emergency number; determining that a dialed number matches the at least one emergency number; when determining that the dialed number matches the at least one emergency number, selecting a domain to perform a call setup procedure, wherein the call setup procedure comprises at least one of a basic call setup procedure and an emergency call setup procedure; when the selected domain is a Packet Switched (PS) domain, performing an emergency call setup procedure; and when the selected domain is a Circuit Switched (CS) domain, performing a basic call setup procedure.

While examples in this disclosure are specific to 5G, Long Term Evolution (LTE), Enhanced Packet System (EPS) and Enhanced Universal Mobile Telephony System (UMTS) Terrestrial Radio Access Network (E-UTRAN) examples, it should be noted that the methods, devices, and systems described herein are not limited to those systems or radio access technology, and could be re-used in other systems or radio access technologies. For example, the methods, devices, and systems described herein could be used with systems including, but not limited to, Third Generation Partnership Project (3GPP) General Packet Radio Service (GPRS) Enhanced Data Rates for Global Evolution (EDGE) Radio Access Network (GERAN), UTRAN, 2G or 3G Core Networks, 3GPP 5G, 3GPP New Radio. Also, non-3GPP systems are not excluded, such as Institute of Electrical and Electronics Engineers (IEEE) systems or Wireless Local Area Networks (WLANs).

Two sets of emergency services exist: a first set where the UE can be configured to detect that a number is an emergency number, and subsequently execute domain specific emergency call procedures; and a second set where the network can be configured to detect that a number is an emergency number. The network (i.e. P-CSCF) may inform the UE that an emergency number was detected. The UE subsequently performs domain specific emergency call procedures or basic call procedures.

While the CS domain supports handling of numbers from the second set efficiently, the IMS or PS domain may be configured to redirect the call setup request. Redirection could lead to attempting the call on the CS domain as a normal call, attempting the call on the CS domain as an emergency call, or attempting the call via the PS domain using emergency call procedures. Subsequent to performing emergency call procedures with the PS domain, the UE may perform emergency call procedures with IMS. Emergency call procedures are also known as emergency procedures. The term call is applicable to the CS domain. However, it is also used instead of the term session. Sessions are typically established via the PS domain using IMS or Session Initiation Protocol (SIP).

A UE may be in CONNECTED mode, or in IDLE mode. A UE is in CONNECTED mode when a Network Access Stratum (NAS) signalling connection between the UE and the network exists. For various reasons, a UE may have to camp on a different cell than the cell it is currently camped on. When in IDLE mode, this is achieved via "redirection". When in CONNECTED mode, this is achieved by performing a Handover procedure. For example, a UE may have to camp on a cell via which emergency services can be obtained.

At the IMS level, a Session Initiation Protocol (SIP) 380 response may be received following an SIP INVITE request, Other SIP responses may be received in response to other SIP requests, including the SIP REGISTER request. Receipt of the SIP 380 may cause the UE to perform cell selection procedures in order to select a cell capable of performing emergency services. Alternatively or additionally, receipt of the SIP 380 may cause the UE to perform an SIP emergency registration procedure in order to create a context suitable for establishing an emergency SIP session. A SIP registration procedure involves transmission of a SIP REGISTER request.

In the present disclosure, all of these procedures are called redirections, unless otherwise stated.

A 5G capable UE can access the 5G CN via New Radio (NR), E-UTRAN or via a WLAN. The 5G CN accessed via a non-3GPP Access Network (AN) (for example a WLAN) may differ from the 5G CN accessed via 3GPP AN (NR and E-UTRAN). The 5G CNs may be owned by different PLMNs, and possibly even by PLMNs operating in different countries.

Emergency services are provided via any access, however they may preferably be provided via a 3GPP AN. While the 5G CN does not provide access to the CS domain, it is possible that the UE is redirected to an E-UTRAN cell from an access network supported by the EPC network. The EPC network offers CS Fallback (a UE performing CS Fallback makes a call using CS procedures via the CS domain). Alternatively, the UE can access the CS domain by selecting a cell part of the GERAN, UTRAN or by selecting a cell supporting CS.

The CS emergency procedures require a UE to indicate the category of emergency service requested. Examples of categories of emergency service are fire brigade, ambulance, police, Marine Guard, or Mountain Rescue. A category may be expressed in bits, as is described in greater detail below.

Likewise, the PS emergency procedures require a UE to indicate the type of emergency service requested. Examples of types of emergency service are fire, ambulance, and police, amongst others. A type may be expressed using Uniform Resource Names (URNs), as is described in greater detail below.

The type or category of emergency service is used, upon receipt by the network, to select a Public Safety Access Point (PSAP).

Each country defines the types or categories of emergency services applicable within that country. Consequently, each country may have a different set of types or categories of emergency services and may use different emergency numbers to identify these types or categories of emergency services.

For numbers in the second set, a call request via NR using 5G may be detected as such by the P-CSCF in the IMS. The P-CSCF may send a SIP response message to the UE, for example in the form of an SIP 380 response. Upon receipt, the 5G UE will now initiate (basic or emergency) call procedures. The 5G PLMN will have configured the UE with either: an indication for Emergency Services Support within a REGISTRATION ACCEPT message to the UE (the Emergency Services Support indication is valid within the current Registration Area); or an Emergency Services Support indicator in the Registration Area Accept message to indicate whether the UE can setup an emergency session (e.g. an emergency Protocol Data Unit (PDU) session) or the UE should perform a Service Request procedure. A Registration Area consists of one or more cells serving the same PLMN. The network may inform the UE what the current Registration Area is. The network keeps track of the UE's current registration area. A location area or a tracking area are equivalent terms in different systems. In EPC, the UE performs NAS attachment or NAS tracking area update procedures in order to inform the network of the tracking area the UE is in.

A diagram of how messages may travel from a UE, through access networks, core networks, and domains before being received at a PSAP is shown with respect to FIG. 1.

As seen in FIG. 1, a UE 101 may communicate with WLAN 102, NG 103, E-UTRAN 104, UTRAN 105, and GERAN 106. WLAN 102, NG 103, and E-UTRAN 104 may communicate with 5G CN 107. E-UTRAN 104 and UTRAN 105 may communicate with EPC 108. UTRAN 105 and GERAN 106 may communicate with CS CN 109. 5G CN 107 and EPC 108 may communicate with PS 110, and from PS 110 to IMS 111 and PSAP 112. CS CN 109 may communicate with CS 113 and from CS 113 to PSAP 112.

If the UE is informed to perform a Service Request procedure upon detecting an emergency call, the network can redirect the UE (using a response message to the SERVICE REQUEST message) to a different system (for example, EPC) or to a different Radio Access Technology (RAT) (e.g. E-UTRAN connected to 5G CN). If redirected to the EPC, the UE may have to initiate another Service Request procedure and the UE may be redirected to a cell supported by a CS CN as part of executing CS Fallback procedures. A Service Request procedure comprises sending a Service Request message.

The 5G CN may be supported by E-UTRAN or NR. Data connections established between the UE and the PS domain may be migrated from one access network to another.

According to the prior art, a UE cannot be configured to detect that a dialed number needs to be handled by a PSAP for which no service category exists.

A user, dialing a number which is known to the serving PLMN to be from the second set of emergency numbers, may receive a SIP 380 response to a first SIP INVITE request (the first SIP INVITE request including the number), the SIP 380 response including a Contact header field set to a URN. The URN may be a country specific URN. If the UE selects the PS domain for a subsequent emergency call attempt, the UE can perform emergency call procedures specific to the PS domain and include the URN in the subsequent SIP INVITE request.

A UE that is using the PS domain for call attempts and whose user dials a number, known to the serving PLMN to be from the second set of emergency numbers, may receive a SIP 380. If the UE selects the CS domain, the UE may perform basic call setup procedures, conditionally.

In the S8 home routing architecture, a roaming UE connects to a P-CSCF in the Home PLMN (HPLMN). The P-CSCF in the HPLMN needs to be provisioned with emergency numbers of the Visitor PLMN (VPLMN), or VPLMN's country. A configured P-CSCF can then detect the emergency numbers that are applicable in the VPLMN's country or in the VPLMN itself.

Figure 2:
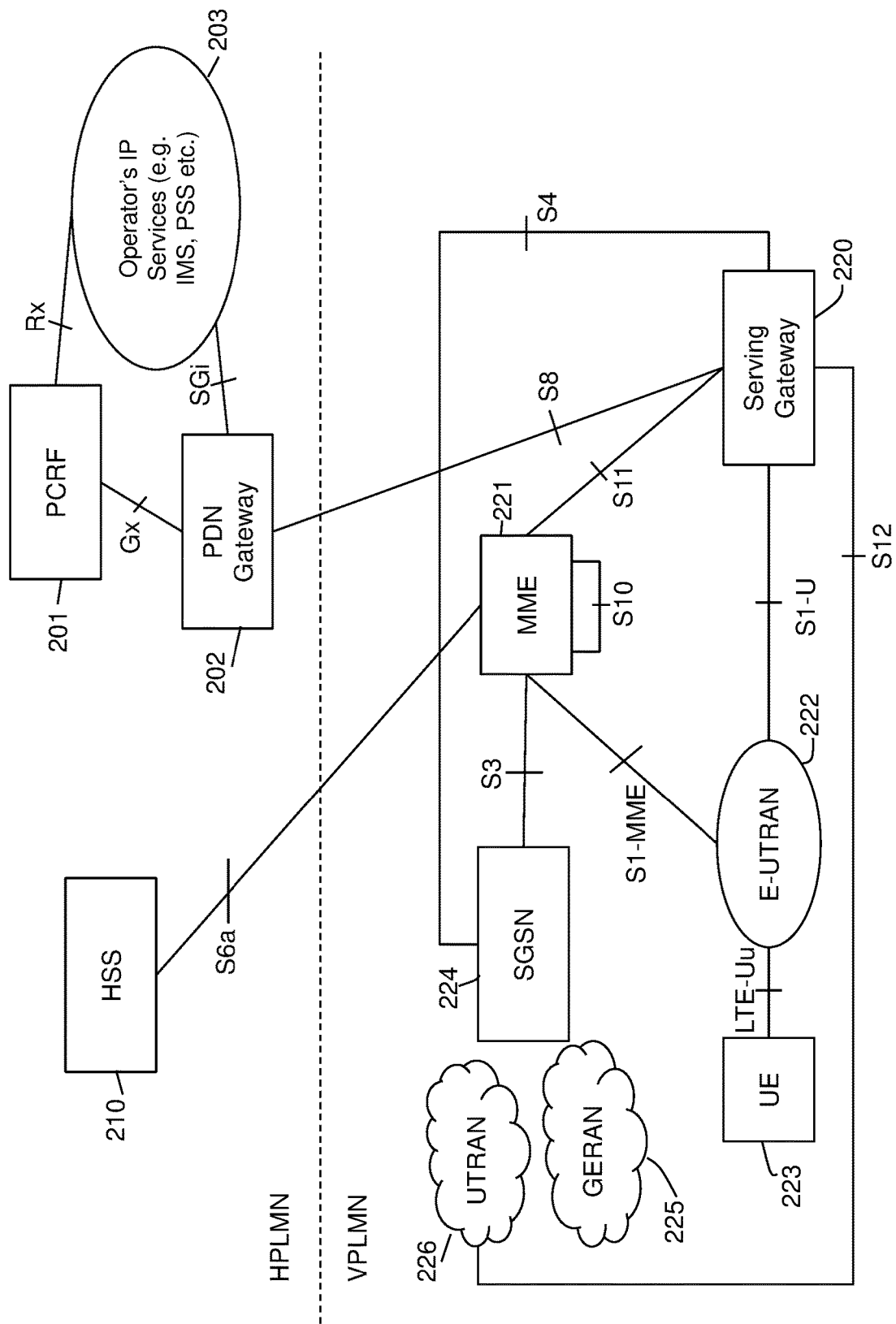
FIG. 2 is a diagram illustrating a roaming architecture for 3GPP access for home routed traffic.

FIG. 2 illustrates the roaming architecture for 3GPP access for home routed traffic. While FIG. 2 is limited to the EPC architecture, it can be appreciated that S8 can also be supported by different architecture, e.g. the architecture describing the 5G system, including the 5G CN. The P-CSCF in the network architecture depicted in FIG. 2, is situated in the "Operator's IP Services".

As seen in FIG. 2, an HPLMN comprises a PDN Gateway 202, an HSS 210, PCRF 201, and the operator's IP services illustrated at 203. The VPLMN comprises UTRAN 226 and GERAN 225. The VPLMN further comprises serving gateway 220, MME 221, and SGSN 224. UE 223 communicates with E-UTRAN 222.

In NAS based provisioning, the UE may receive one or more numbers associated with emergency service categories (known hereafter as "service categories"). The definition of service categories is defined in 3GPP Technical Specification (TS) 24.008 "Mobile Radio Interface Layer 3 specification; Core Network Protocols; Stage 3", v. 15.0.1, September 2017, and is included below. The numbers provisioned or configured this way are part of the first set of emergency numbers. NAS based provisioning involves NAS messages. NAS messages, part of protocols used to interact with a CN (e.g. the EPC network, 5G CN, or GPRS CN), may include at least one Information Element (IE).

Section 10.5.3.13 of 3GPP TS 24.008 is reproduced below, where the FIG. 10.5.84c/3GPP TS 24.008 referred to in the table is reproduced as FIG. 6 herein:

---

10.5.3.13 Emergency Number List

---

The purpose of this information element is to encode emergency number(s)

for use within the country where the IE is received.

The Emergency Number List information element is coded as shown in

FIG. 10.5.84c/3GPP TS 24.008.

The Emergency Number List IE is a type 4 information element with a minimum length of 5 octets and a maximum length of 50 octets.

---

NOTE 1: The length contains the number of octets used to encode the Emergency Service Category Value and the Number digits.

NOTE 2: The number digit(s) in octet 5 precedes the digit(s) in octet 6 etc. The number digit, which would be entered first, is located in octet 5, bits 1 to 4. The contents of the number digits are coded as shown in table 10.5.118/3GPP TS 24.008.

NOTE 3: If the emergency number contains an odd number of digits, bits 5 to 8 of the last octet of the respective emergency number shall be filled with an end mark coded as "1111".

FIG. 10.5.84c/3GPP TS 24.008 Emergency Number List information element

TABLE 10.5.97aa/3GPP TS 24.008

| Emergency Number List information element |
|---|
| Emergency Service Category Value (octet 4, j + 1, n + 1, etc.; bit 1 to 5) Bits 1 to 5 are coded as bits 1 to 5 of octet 3 of the Service Category information element as specified in subclause 10.5.4.33. |

Section 10.5.4.33 of 3GPP TS 24.008 is reproduced below, where the FIG. 10.5.118d/3GPP TS 24.008 referred to in the table is reproduced as FIG. 7 herein:

| 10.5.4.33 Service category |
|---|
| The purpose of the Service category information element is to provide the network with information about services invoked by the user equipment.<br>The Service category information element is coded as shown in FIG. 10.5.118d/3GPP TS 24.008 and table 10.5.135d/3GPP TS 24.008<br>The Service category is a type 4 information element with a minimum length of 3 octets. |

TABLE 10.5.135d/3GPP TS 24.008

| Service Category information element |
|---|
| Emergency Service Category Value (octet 3)<br>The meaning of the Emergency Category Value is derived from the following settings (see 3GPP TS 22.101 [8] clause 10):<br>Bit 1 Police<br>Bit 2 Ambulance<br>Bit 3 Fire Brigade<br>Bit 4 Marine Guard<br>Bit 5 Mountain Rescue<br>Bit 6 manually initiated eCall<br>Bit 7 automatically initiated eCall<br>Bit 8 is spare and set to "0"<br>Mobile station may set one or more bits to "1"<br>If more than one bit is set to "1", routing to a combined Emergency centre (e.g. ambulance and fire brigade in Japan) is required. If the MSC can not match the received service category to any of the emergency centres, it shall route the call to an operator defined default emergency centre.<br>If no bit is set to "1", the MSC shall route the Emergency call to an operator defined default emergency centre.<br>A mobile station initiating an eCall shall set either bit 6 or bit 7 to "1". The network may use the information indicated in bit 6 and bit 7 to route the manually or automatically initiated eCall to an operator defined emergency call centre. |

While NAS based provisioning (e.g. of numbers which are part of the first set of emergency numbers) takes place during e.g. NAS attachment or NAS tracking area update procedures, the UE may receive a SIP 380 response in response to an SIP INVITE with a Uniform Resource Identifier (URI) indicating a number from the second set. The SIP 380 response may include a Contact header field with a URN. Depending on the URN, the UE may be able to derive a service category, applicable to the CS domain, or the UE may not be able to derive a service category (in this case the URN is likely a Country specific emergency service URN). If the UE decides to re-attempt the call on the CS domain, it either performs emergency call procedures (including a category in an EMERGENCY SETUP message) or basic call procedures (including the number in a SETUP message). If the UE decides to re-attempt the call on the PS domain, the UE performs an emergency call session setup, as described below, and includes the URN received in a SIP INVITE request.

When the P-CSCF responds with an SIP 380 response, it may include a 3GPP IP Multimedia (IM) CN subsystem eXtensible Markup Language (XML) body in this response. It may or may not include an indication indicating "emergency-registration". This indication is a redirection, urging the UE to perform an initial emergency registration using a different VPLMN, if available.

The UE may perform an emergency call session setup in accordance with subclauses 5.1.6.8, and 7.11.1 of 3GPP TS 24.229 "IP multimedia call control protocol based on Session Initiation Protocol (SIP) and Session Description Protocol (SDP); Stage 3", v. 15.0.0, September 2017, which are reproduced below.

5.1.6.8 Emergency session setup
5.1.6.8.1 General
When an initial request for a dialog or a standalone transaction, or an unknown method transmitted as part of UE detected emergency call procedures as defined in subclause 5.1.6 is initiated upon reception of 380 (Alternative Service) response to an initial request for a dialog, or a standalone transaction, or an unknown method as defined in procedures in subclause 5.1.2A.1.1, subclause 5.1.3.1, subclause 5.1.6.8.1, subclause 5.1.6.8.3 and subclause 5.1.6.8.4, and if the 380 (Alternative Service) response contains a Contact header field containing a service URN with a top-level service type of "sos", the UE shall set the Request-URI of the initial request for a dialog or the standalone transaction, or the unknown method transmitted as part of UE detected emergency call procedures as defined in subclause 5.1.6 to the service URN of the Contact header field of the 380 (Alternative Service) response.
7.11.1 Country specific emergency service URN
7.11.1.1 Introduction
The country specific emergency service URN is intended to uniquely identify a type of emergency service for which an emergency service URN, i.e. a service URN with a top-level service type of "sos" as specified in RFC 5031 [7], registered by IANA is not available.
The country specific emergency service URN is intended to be used only when an emergency service URN for a given type of emergency service, with approximately the same caller expectation in terms of services rendered, is not registered by IANA.
The country specific emergency service URN is intended to be used only inside the country where the national regulatory authority defines emergency services only by national numbers. The country specific emergency service URN is not intended to be used by the UE except when indicated by the network.
7.11.1.2 Syntax
The country specific emergency service URN is a service URN with:
1) the top-level service type of "sos" as specified in RFC 5031 [7];
2) the first sub-service of "country-specific";
3) the second sub-service indicating the country where the type of emergency service is deployed. The format of second sub-service is an ISO 3166-1 alpha-2 code as specified in ISO 3166-1 [8]; and
4) the third sub-service uniquely identifying the type of emergency service in the country where the type of emergency service is deployed. The third sub-service is defined by the national regulation of the country where the type of emergency service is deployed.
EXAMPLE: urn:service:sos.country-specific.xy.567 can identify a type of emergency service identified by an emergency number 567 in a country identified by "xy" ISO 3166-1 alpha-2 code as specified in ISO 3166-1 [8].
7.11.1.3 Operation
Unless explicitly prohibited, wherever an emergency service URN i.e. a service URN with the top-level service type of "sos" as specified in RFC 5031 [7] can be used, the country specific emergency service URN can also be used.

A Domain Name System (DNS) enables resolution of given input data to one or more output data, by for example resolving domain names to one or more IP addresses, or resolving domain names to one or more Naming Authority Pointer (NAPTR) records. A DNS consists of a DNS client and a DNS server. A DNS client may be provided as part of, or within a UE. A DNS client sends data to be resolved in a DNS request message to a DNS server. A DNS server, when receiving a DNS request from a DNS client, may respond to the DNS request with a DNS response that contains a resolution of the requested data or may provide the address of another DNS server to which the DNS client should resend its DNS request. In providing a response that contains a resolution of the requested data, the DNS server may use configuration that it has access to, send one or more DNS requests to one or more other DNS servers or use data from a cache (i.e. data previously received from other DNS servers that is not known to be stale).

A UE, in order to be able to provide DNS client functionality, needs to be configured with one or more DNS server addresses such as Internet Protocol version 4 (IPv4) addresses, and Internet Protocol version 6 (IPv6) addresses, amongst others. A UE may receive a DNS server's IP address when it requests connectivity with a data network, like a Packet Data Network (PDN) or others. The DNS server's IP address is returned by the network. Typically, the DNS server's IP address is included in the Protocol Configuration Options (PCO) Information Element (IE). The PCO IE is delivered to the UE in an NAS message.

A DNS server operated by the PLMN offering emergency services should be trustable, meaning that neither the DNS server is expected to be compromised nor the DNS requests and responses are expected to be compromised while in transit between DNS server and UE.

A DNS server's IP address is typically configured when the UE connects to the entry point, like a PDN GW or UPF of the data network, such as a data network that hosts the IMS. This entry point may be in the VPLMN or in the HPLMN. In S8, the entry point is in the HPLMN.

The Global System for Mobile Communications (GSM) Association (GSMA) runs a database whereby PLMN operators can exchange data that allows them to provide roaming for their subscribers to each other's PLMNs. The database is useful for updating other PLMNs about static data, which includes emergency numbers and categories in a 5-bit format. This database is called the NG RAEX IR.21 Database. Therefore, since emergency numbers and categories is not very dynamic, data from this database can be extracted and configured in the HPLMN P-CSCF in order to determine emergency numbers in the first set that can be recognized as emergency numbers in a roaming user's VPLMN, if detected in a SIP INVITE.

As part of PS emergency call procedures the UE often needs to perform an IMS emergency registration procedure. As part of the IMS emergency registration procedure the UE transmits an SIP REGISTER request containing an "sos" SIP URI parameter in the Contact header field.

A P-CSCF receiving this SIP REGISTER request may respond with a 420 (Bad Extension) or a 403 (Forbidden) response. The P-CSCF may include a 3GPP IM CN subsystem XML body in this response. If the network supports an emergency session for an unregistered user, the P-CSCF may further include an indication indicating "anonymous-emergencycall".

GPRS and EPS support delivery of emergency numbers and categories during the NAS attachment or e.g. NAS tracking area update procedures. The advantage of delivering this information during these procedures is that a UE can know whether an emergency number is dialed immediately after successful network attachment. The equivalent of the NAS attachment or e.g. NAS tracking area update procedures in 5G are herein called the 5G registration procedures. The 5G registration procedures include the UE sending a REGISTRATION REQUEST message and the UE receiving e.g. a REGISTRATION ACCEPT message.

While the present disclosure aims to provide a solution that applies to any access technology, 5G specific solutions may still be needed in addition. For example, to prevent situations of race conditions, where the UE is able to initiate voice calls after successful 5G registration, but before the UE has received the emergency information via another protocol, such as DNS. In this period of time a number would not be detected as an emergency number by the UE.

A P-CSCF in general is not aware of the emergency numbers, categories or types in use in a VPLMN. For S8, a P-CSCF in the HPLMN needs to detect whether a number is in the second set for the VPLMN or the VPLMN's country. The NG RAEX IR.21 Database doesn't provide this information.

Alternatively or additionally, a VPLMN should be able to perform NAS procedures to configure the UE with numbers from the second set.

The NG RAEX IR.21 Database does not provide sufficient information to the P-CSCF. For example, there is no indication that the UE must make a basic CS basic call if a SIP 380 response is received for a SIP INVITE. There is no information that would allow a UE to retry the emergency call on PS domain, using a Country specific emergency service URN.

The SIP 380 response can further include one of the two the following optional indications: "emergency registration" or "anonymous-emergencycall". The NG RAEX IR.21 Database does not allow the VPLMN to inform the HPLMN that it's P-CSCF needs to include such an indication or not.

The IMS (e.g. the P-CSCF) supported by 5G CN may detect that a SIP INVITE contains an emergency number. The P-CSCF may reject the SIP INVITE with a SIP 380 response, as discussed above, or the P-CSCF may accept the SIP INVITE, indicating in a response to the UE that the SIP INVITE was for emergency services. If a session results from the SIP INVITE, the session is considered an emergency session. However, the emergency services session is not using a bearer dedicated for emergency services.

Where the target RAT, for example NR, is unsuitable for emergency services, a bearer with the emergency session should remain on the source RAT (just like the emergency bearer would). Since the AMF as currently specified in 3GPP TS 23.501, *"System Architecture for the 5G System; Stage 2"*, v. 15.0.0, December 2017, is unaware that a session considered an emergency session is using a normal, non-emergency bearer, this session may be migrated or handed over to the RAT unsuitable for emergency services.

It may be undesirable to hand over an emergency session using a non-emergency bearer to a RAT that does not support emergency services.

The present disclosure presents solutions to the above problems with references to examples or embodiments which are not absolute and textual constructs or IEs are for illustrative purposes. Other IE layout or other domain name label orderings could be possible and are within the scope of the present disclosure. Furthermore, some embodiments described herein may be combined with other embodiments without departing from the scope of the present disclosure.

The present disclosure provides solutions that aim to provision the UE with emergency information. Emergency information consists of emergency numbers, URNs, categories, or indications. For each emergency number there is one or more of the following: a URN (e.g. suitable for the PS domain); a category (e.g. suitable for the CS domain); or an indication that the UE needs to use basic call procedures on the CS domain.

Alternatively, the indication that the UE use basic call procedures on the CS domain can be an indication that the UE use emergency call procedures on the PS domain only, an indication that the UE use emergency session procedures on PS domain only, or an indication that the UE use emergency procedures on PS domain only.

The emergency information provisioned to the UE can be considered valid. Valid emergency information can be used by the UE when comparing dialed numbers or digits with provisioned emergency numbers (e.g. part of the emergency information) in order to detect if a dialed number is an emergency number.

When a (e.g. dialed) number is an emergency number, the UE invokes domain specific emergency call setup procedures or invokes basic CS call setup procedures, depending on the domain selected and depending on the emergency information.

When using E-UTRAN, the UE may perform CS fallback procedures (for basic call) or indicate CS fallback for emergency call during the CS fallback procedures. If the emergency information indicates the UE needs to invoke basic CS call setup procedures, the UE performs CS fallback procedures, without indicating CS fallback for emergency call.

A VPLMN's network servers, including but not limited to MME, AMF, Serving GPRS Support Node (SGSN) or DNS servers, may maintain a configuration indicating per country code, such as a Mobile Country Code (MCC), or per VPLMN:
   a first value indicating the country where the type of emergency service is deployed or a second value uniquely identifying the type of emergency service in the country where the type of emergency service is deployed. The first value (e.g. xy) and the second value (e.g. 567) allow a URN such as "urn:service:sos.country-specific.xy.567" to be constructed, as discussed with reference to 3GPP TS 24.229.
   a value representing a 5-bit Service Category value or the 5-bit Service Category value itself, as discussed with reference to 3GPP TS 24.008;
   whether the call should be setup on the CS domain instead of the PS domain (using IMS);
   whether basic call procedures or emergency call procedures should be used in the CS domain; or
   whether the P-CSCF should send a particular SIP response to the UE and whether the SIP response should include "emergency-registration" or "anonymous-emergencycall".

Re-Purposing Category Values

The NAS signalling to the UE provides 5 bits to the UE, providing for $2^5=32$ possibilities. Few of these bit combinations have been reserved. Most PLMNs would set one of the five bits to identify one of the categories of emergency services supported in the country. In some countries, combinations are possible. For example, if more than one bit is set to 1, routing to a combined emergency center, such as an ambulance and fire brigade in Japan, is required.

That still leaves most possible combinations of the 5 bits unused.

These unused combinations can be used to encode emergency services previously not expressed in the service category. This could enable usage of CS emergency call procedures for emergency services previously being handled via basic call procedures on the CS domain.

On the PS domain, UE modifications are needed to derive a URN from these new combinations. However, at least some UEs, which are already deployed, cannot be modified. Provisioning P-CSCF with Emergency Information Obtained from a Database of Roaming Related Data At present the P-CSCF can be provisioned with emergency URNs, but there is no simple, reliable, secure, or scalable way to obtain them from VPLMNs. Specifically, PLMN operators have to contact all of their roaming partner PLMN operators to share or request necessary data.

Therefore, this solution aims to enable HPLMN operators to provision their network (e.g. P-CSCFs or DNS servers, amongst others) with their roaming partner VPLMN's emergency URNs (including country-specific URNs) by enabling VPLMN operators to put into a database the necessary data to enable roaming partners and HPLMN operators to configure their P-CSCFs or DNS server (as used in IMS S8HR roaming). This data may comprise:

- a first value indicating the country where the type of emergency service is deployed or a second value uniquely identifying the type of emergency service in the country where the type of emergency service is deployed;
- a value representing a 5-bit Service Category value or the 5-bit Service Category value itself;
- an indication of whether the call should be setup on the CS domain instead of the PS domain (using IMS) and whether basic call procedures or emergency call procedures should be used in the CS domain; or
- an indication that the P-CSCF should send a particular SIP response to the UE and whether the SIP response should include "emergency-registration" or "anonymous-emergencycall".

A P-CSCF may either query the roaming database or DNS or maintain configuration information indicating per country code (e.g. MCC) or per VPLMN:

- whether to include "emergency-registration" or "anonymous-emergencycall" in a SIP response;
- whether to include a URN in the SIP response's Contact header field and which URN to include.

A HPLMN DNS server may maintain configuration information indicating per country code (e.g. MCC) or per VPLMN:

- a portion of a URN. For country specific URNs, the portion of a URN could include a first value indicating the country where the type of emergency service is deployed or a second value uniquely identifying the type of emergency service in the country where the type of emergency service is deployed. For other cases, such as a URN according to Request For Comment (RFC) 5031, "A Uniform Resource Name (URN) for Emergency and Other Well-Known Services", January 2008, the portion of a URN could be, for example, "sos.police" from the URN "urn:service.sos.police;
- a value representing a 5-bit Service Category value or the 5-bit Service Category value itself;
- an indication of whether the call should be setup on the CS domain instead of the PS domain (using IMS) and whether basic call procedures or emergency call procedures should be used in the CS domain; or
- an indication that the P-CSCF should send a particular SIP response to the UE and whether the SIP response should include "emergency-registration" or "anonymous-emergencycall".

Alternatively, if the information is available via a DNS query from the HPLMN P-CSCF, the P-CSCF may obtain the information by querying a VPLMN DNS server with a Fully Qualified Domain Name (FQDN) including a PLMN code or an MCC code.

Mappings as described below between 5-bit service categories and domain names or FQDNs may apply, with the clarification that a hostname is a string of alphanumeric values. The alphanumeric values can be obtained from a roaming database or DNS server as part of the emergency information. The P-CSCF or DNS may obtain the alphanumeric values from the roaming database.

Prevent Handing Over Connections within which there is an Emergency Session

In order for a network to prevent handing over connections within which there is an emergency session, the network is informed by the IMS (including the P-CSCF that accepted the emergency session) that the connection has an emergency session. The network may then prevent redirecting or handing over a connection that has an emergency session to a RAT or CN that doesn't support emergency sessions.

Provisioning the UE with Emergency Information

While the present disclosure describes DNS and NAS provisioning methods, other methods may also apply including Access Network Query Protocol (ANQP), Internet Key Exchange Version 2 (IKEv2), Dynamic Host Configuration Protocol (DHCP), and HyperText Transfer Protocol (HTTP). The above list of methods is not intended to be limiting.

Figure 3:
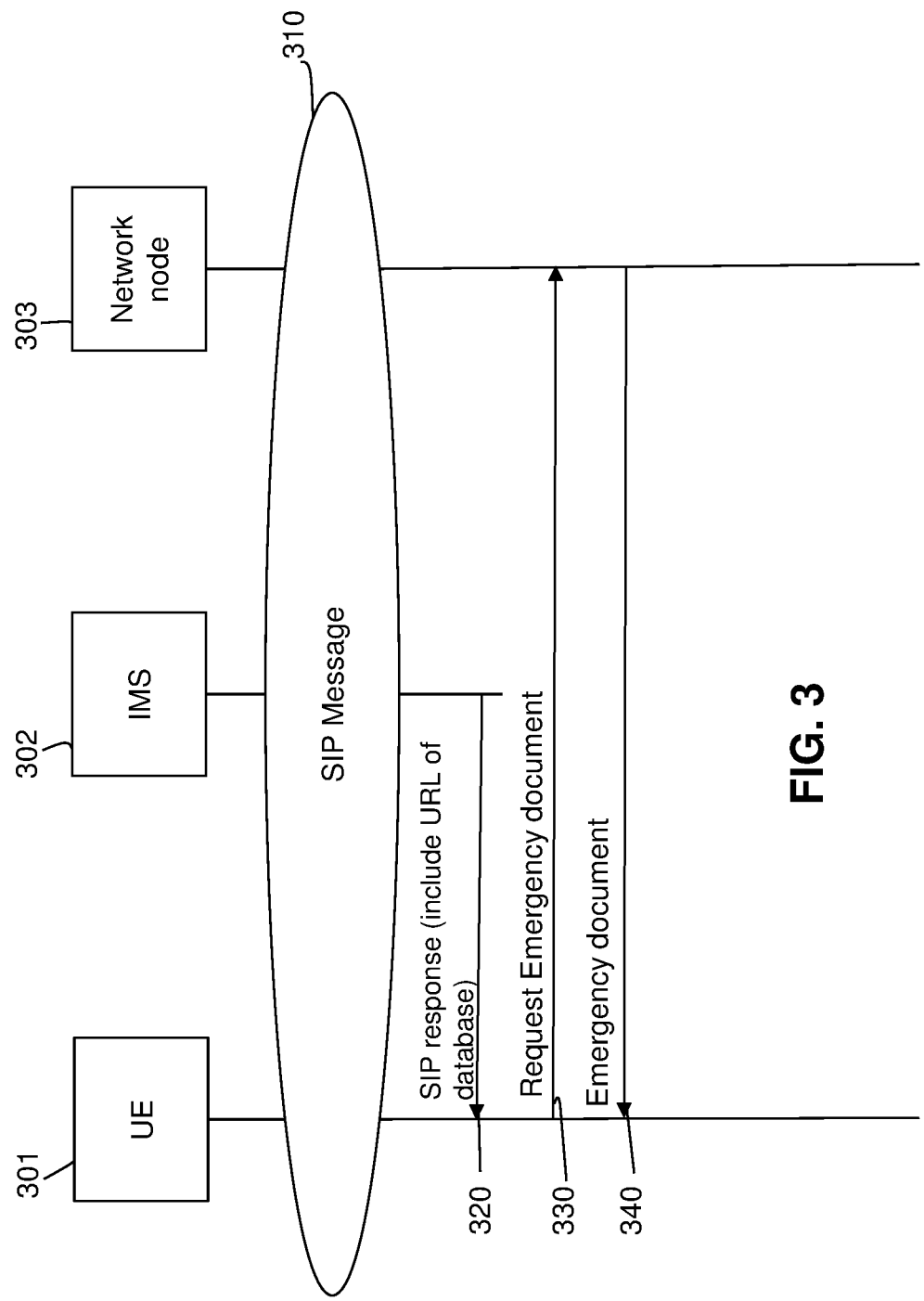
FIG. 3 is a diagram illustrating request and response protocols for obtaining an emergency document.

Examples of request and response protocols are shown with respect to FIG. 3. The response may include an emergency document. An emergency document is considered emergency information. An emergency document may encode the emergency information in XML (eXtended Markup Language). This document includes other examples of encoding emergency information, e.g. in IEs or in domain names or in strings or in labels. A domain name, a host name, or a label are all considered strings. A string is not limited to be being a domain name, a host name, or a label. A domain name may include one or more hostnames. A domain name or a hostname are also considered labels. A URN may include labels.

As seen in FIG. 3, UE 301 may communicate with a network node 303 through IMS 302. As illustrated by arrow 330, a request is transmitted to the network node 303 for an emergency document and the emergency document is returned to the UE 301, as illustrated by arrow 340. The request may be an HTTP GET message, a DNS request, or a DHCP request, and include location information.

5G

When using a 3GPP access and a non-3GPP access to access the 5G CN, the UE may register with different PLMNs via each access. This typically means the UE is using different core networks. Typically, a PLMN runs its own core network.

When the UE receives emergency information from the AMF in response to a REGISTRATION REQUEST message sent by the UE, the UE can use this information to find a match between a (e.g. dialed) number and an emergency number in the emergency information. Each emergency number, within the emergency information, is associated with at least one of a circuit switched emergency (CSE) call indicator, Emergency Service Category Value, URN for emergency service, or country-specific emergency URN. A URN for emergency service or a country-specific emergency URN is considered an emergency URN.

The UE may reconstruct the (country-specific) emergency URN (for emergency service) from the received emergency information. For example, the last hostname of a country-specific emergency URN may have digits that are the same as the emergency number's digits or, the last hostname of a country-specific emergency URN may have characters that do not necessarily equate to the emergency number's digits. If the emergency URN is not a country-specific emergency URN, the emergency URN can be derived from the Emergency Service Category Value. For example, urn:service:

sos.police can be derived from an Emergency Service Category Value with only the first bit set. The emergency information received may include an indication indicating whether the emergency URN is to be derived from the Emergency Service Category Value.

Depending on the domain selected, the UE performs PS emergency call procedures or CS procedures. Depending on the value of the CSE, the CS procedures consist of CS emergency call procedures or CS basic call procedures. If the UE performs PS emergency call procedures, the UE may include the emergency URN in a SIP INVITE message. If the UE performs CS emergency call procedures, the UE may include the Emergency Service Category Value in an EMERGENCY SETUP message. If the UE performs CS basic call procedures, the UE may include the dialed digits in a SETUP message.

One 5G CN

When using the E-UTRAN, NR, or WLAN to access the 5G CN, the UE may need to register to obtain services. The UE registers by transmitting a REGISTRATION REQUEST message. In response to the registration request the UE may receive emergency information including e.g. a list with one or more emergency numbers, associated categories, associated URNs, an indication that a call to the number triggers emergency procedures on the PS domain only, or an indication that a call to the number triggers basic procedures on the CS domain. The emergency information received as part of NAS registration procedures.

The UE also sends the registration request periodically, for example, to update registration information held by the 5G CN. In response to these registration requests, the UE may receive the list with one or more emergency numbers mentioned above. If the UE receives an empty list (i.e. a list of size zero), the UE may either replace a previously stored list with an empty list or the UE may ignore the empty list. If the UE receives no list, the UE may not overwrite a previously received list.

Replacing a previously received list with an empty list is useful when the UE registers with a PLMN in the same country, and this PLMN handles all emergency call detection in the network, beyond what is detected due to Mobile Entity (ME) hard coded numbers and Universal Subscriber Identity Module (USIM) provisioned numbers.

Two 5G CNs

When using the E-UTRAN or NR to access the 5G CN and when using the WLAN to access another 5G CN, the other 5G CN may be part of a different PLMN. The other 5G CN may even be situated in a different country.

The same may occur when the UE accesses EPC via 3GPP access and non-3GPP access. A UE accessing EPC via 3GPP access may receive a policy indicating whether a UE may consider emergency information received via non-3GPP access.

Further, emergency information received via non-3GPP access may also be associated with country information, such as an MCC. The country information identifies the country for which the emergency information is valid. Valid emergency information can be used when comparing dialed numbers with provisioned emergency numbers, in order to detect if a dialed number is an emergency number.

One 5G CN and One Non-5G CN

When using E-UTRAN or NR to access the 5G CN and when using the WLAN to access an EPC, the EPC may be part of a different PLMN. The other EPC may even be situated in a different country.

The same considerations as in the case of two 5G CNs apply here, with the clarification that one of the two CNs is a non-5G CN.

Last Hostname Consists of Characters

The Emergency Information IE proposed below is included in a response to the UE's request to register with the network, such as, but not limited to, a 5G CN. The Emergency Information IE contains information to reconstruct a country-specific emergency URN (e.g. "urn:service:sos.country-specific.XY.567". The portions "sos", "country-specific", "XY", "567" are considered labels. A labels consists of one or more characters. The characters allowed in a hostname are typically also those allowed in a label). The last label, e.g. "567", need not consist of characters that match the number digits in the emergency number. If they do not match, the "length of the emergency label" field indicates the number of octets occupied by the subsequent characters. The characters may be encoded in accordance with a coding scheme. The characters represent the characters of the last label. When the "length of the emergency label" field is set to 0 or the emergency information received includes an indication indicating that the URN is a country specific URN, the number of digits in the Emergency Information IE represent the characters of the last label, for example "567". The Country Characters in the Emergency Information IE represent the characters of the penultimate label, for example "XY". The label or first sub-service "country-specific" and the label or top-level service "sos" complete the hostname. The country specific URN is reconstructed by prepending these labels with "urn:service:".

The Emergency Information IE contains coding scheme information. Where the encoding scheme is GSM default alphabet, language unspecified, defined in 3GPP TS 23.038, *"Alphabets and language-specific information"*, v. 14.0.0, March 2017, the proposed IE below has limited the allowable characters to those that can be encoded in 7 bits. Alternatively, a 16 bit encoding could be chosen, for example Universal Coded Character Set (UCS-2), requiring each character to occupy 2 consecutive octets.

Emergency Information IE

The purpose of this information element is to encode emergency information for use within the country indicated within the IE.

The Emergency Number List information element is coded as shown in FIGS. 8A and 8B, where FIG. 8B flows from FIG. 8A. The Emergency Number List IE may be a type 4 information element. No upper length limit is specified except for that given by the maximum number of octets in an L3 message, as provided in 3GPP TS 44.006, *"Mobile Station—Base Station System (MS—BSS) interface; Data Link layer specification"*, v 14.0.0, March 2017.

NOTE 0: This field contains an upper case character if encoded in the GSM default alphabet, language unspecified, defined in 3GPP TS 23.038.

NOTE 1: The length contains the number of octets used to encode the Emergency Service Category Value and the Number digits.

NOTE 2: The number of digit(s) in octet 5 precedes the digit(s) in octet 6 etc. The number digit, which would be entered first, is located in octet 5, bits 1 to 4. The contents of the number digits are coded as shown in table 10.5.118 of 3GPP TS 24.008.

NOTE 3: If the emergency number contains an odd number of digits, bits 5 to 8 of the last octet of the respective emergency number may be filled with an end mark coded as "1111".

NOTE 4: A character string, encoded in accordance with the coding scheme.

except for that given by the maximum number of octets in a L3 message (see 3GPP TS 44.006).

TABLE 1

Emergency Information information element

MCC, Mobile country code (octet 3 and 4; bit 1 to 4)
The MCC field is coded as in ITU-T Rec. E212, Annex A.
Coding Scheme (octet 4, bits 5-7)
0 0 0   Cell Broadcast data coding scheme, GSM default alphabet, language unspecified, defined in 3GPP TS 23.038
0 0 1   USC2 (16 bit)
0 1 0   Reserved
to
1 1 1
2 Character String (octet 6 to octet 7, inclusive; or octet 6 to octet 9, inclusive)
Encoded according to the Coding Scheme defined by octet 4, bits 5-7. Taken together, the two upper case characters represent an ISO 3166-1 alpha-2 code as specified in ISO 3166-1.
CSE, Circuit Switched Emergency call (octet 7, bit 8 or octet 9, bit 8)
8
1 The call to be established is an emergency call
0 The call to be established is a basic call
Emergency Service Category Value (octet 4, j + 1, n + 1, etc.; bit 1 to 5)
Bits 1 to 5 are coded as bits 1 to 5 of octet 3 of the Service Category information element as specified in subclause 10.5.4.33 of TS 24.008.
Depending on the coding scheme, a Label character either encompasses 2 octets or 4 octets.
Length of URI's last emergency label (octet, bits 1 to 7)
Indicates the length in octets of the URI's last emergency label, if the value is not 0 and CCU is set to "The URN is a country specific URN"
CSEU, Country Specific Emergency URN (bit 8)
8
1 The URN is a country specific URN
0 The URN is derived from the Emergency Service Category Value.

Last Hostname Consists of Numbers Matching the Dialed Digits

The Emergency Information IE proposed below is included in a response to the UE's request to register with the 5G CN. The Emergency Information IE contains enough information to reconstruct a country-specific emergency URN (for example "urn:service:sos.country-specific.XY.567"), if the emergency information received includes an indication indicating that the URN is a country specific URN. The number of digits in the Emergency Information IE represent the characters of the last label, e.g. "567". The Country Characters in Emergency Information IE represent the characters of the penultimate label, e.g. "XY". The label "country-specific" and the label "sos" complete the hostname. The country specific URN is reconstructed by prepending this hostname with "urn:service:".

The Emergency Information IE contains coding scheme information. Where the encoding scheme is GSM default alphabet, language unspecified, defined in 3GPP TS 23.038, the proposed IE below has limited the allowable characters to those that can be encoded in 7 bits, with the last 2 bits set to 10. Alternatively, the bits could be set to force the characters to be lower case characters. Alternatively, the last 2 bits of the 7 do not need to be hardcoded. Alternatively, a 16 bit encoding could be chosen (for example, UCS2). Requiring each character to occupy 2 consecutive octets.

The purpose of this information element is to encode emergency information for use within the country indicated within the IE.

The Emergency Number List information element is coded as shown in FIGS. 9A and 9B, where FIG. 9B flows from FIG. 9A. The Emergency Number List IE is a type 4 information element. No upper length limit is specified NOTE 0: This field contains an upper case character if encoded in the GSM default alphabet, language unspecified, defined in 3GPP TS 23.038.

NOTE 1: The length contains the number of octets used to encode the Emergency Service Category Value and the Number digits.

NOTE 2: The number digit(s) in octet 5 precedes the digit(s) in octet 6 etc. The number digit, which would be entered first, is located in octet 5, bits 1 to 4. The contents of the number digits are coded as shown in table 10.5.118/3GPP TS 24.008.

NOTE 3: If the emergency number contains an odd number of digits, bits 5 to 8 of the last octet of the respective emergency number may be filled with an end mark coded as "1111".

TABLE 2

Emergency Information information element

MCC, Mobile country code (octet 3 and 4; bit 1 to 4)
The MCC field is coded as in ITU-T Rec. E212, Annex A.
Coding Scheme (octet 4, bits 5-7)
0 0 0   Cell Broadcast data coding scheme, GSM default alphabet, language unspecified, defined in 3GPP TS 23.038
0 0 1   USC2 (16 bit)
0 1 0   reserved
to
1 1 1
2 Character String (octet 6 to octet 7, inclusive; or octet 6 to octet 9, inclusive) Encoded according to the Coding Scheme defined by octet 4, bits 5-7. Taken together, the two upper case characters represent an ISO 3166-1 alpha-2 code as specified in ISO 3166-1.

TABLE 2-continued

Emergency Information information element

CSE, Circuit Switched Emergency call (octet 7, bit 8 or octet 9, bit 8)
8
1 The call to be established is an emergency call
0 The call to be established is a basic call
Emergency Service Category Value (octet 4, j + 1, n + 1, etc.; bit 1 to 5)
Bits 1 to 5 are coded as bits 1 to 5 of octet 3 of the Service Category information element as specified in subclause 10.5.4.33 of TS 24.008.

A Second IE with Emergency Information Complementing the Emergency Number List IE The Emergency Information IE proposed below is included in a response to the UE's request to register with the CN or in a response to the UE's request to (update location information (for non-5G CN), tracking area information (for non-5G CN: EPC network), or) registration area information with the CN. The Extended Number List IE may also be known as the Emergency Information IE or by an otherwise named IE. The Emergency Information IE contains enough information to reconstruct a country-specific emergency URN (e.g. "urn:service:sos.country-specific.XY.567").

The Emergency Information IE contains coding scheme information. Where the encoding scheme is GSM default alphabet, language unspecified, defined in 3GPP TS 23.038, the proposed IE below has limited the allowable characters to those that can be encoded in 7 bits, with the last 2 bits set to 10. Alternatively, the bits could be set to force the characters to be lower case characters. Alternatively, the last 2 bits of the 7 do not need to be hardcoded. Alternatively, a 16 bit encoding could be chosen (e.g. UCS2), requiring each character to occupy 2 consecutive octets.

The "length of the emergency label" field indicates the number of octets occupied by the subsequent characters. The characters may be encoded in accordance with a coding scheme. The characters represent the characters of the last label.

The emergency numbers in the Emergency Number List IE are intended to correspond with the labels in the Emergency Information IE: the 1st Emergency Number information digits correspond to the 1st URI's last emergency label. If the Length of 1st URI's last emergency label is set to 0 or the emergency information received includes an indication indicating that the URN is a country specific URN, the last label of the country-specific URN matches the number digits in the emergency number in the Emergency Number List IE. If the Length of 1st URI's last emergency label is set to non-zero, the last label of the country-specific URN matches the label characters.

The Country Characters in Emergency Information IE represent the characters of the penultimate label, e.g. "XY". The label "country-specific" and the label "sos" complete the hostname. The country specific URN is reconstructed by prepending this hostname with "urn:service:".

The purpose of this information element is to encode emergency information for use within the country indicated within the IE.

The Emergency Number List information element is coded as shown below.

The Emergency Number List IE is a type 4 information element, as shown in FIG. 10. No upper length limit is specified except for that given by the maximum number of octets in a L3 message (see 3GPP TS 44.006).

NOTE 0: This field contains an upper case character if encoded in the GSM default alphabet, language unspecified, defined in 3GPP TS 23.038.

NOTE 1: The length contains the number of octets used to encode the Emergency Service Category Value and the Number digits.

NOTE 2: The number of digit(s) in octet 5 precedes the digit(s) in octet 6 etc. The number digit, which would be entered first, is located in octet 5, bits 1 to 4. The contents of the number digits are coded as shown in table 10.5.118 of 3GPP TS 24.008.

NOTE 3: If the emergency number contains an odd number of digits, bits 5 to 8 of the last octet of the respective emergency number shall be filled with an end mark coded as "1111".

NOTE 4: A character string, encoded in accordance with the coding scheme.

TABLE 3

Emergency Information information element

MCC, Mobile country code (octet 3 and 4; bit 1 to 4)
The MCC field is coded as in ITU-T Rec. E212, Annex A.
Coding Scheme (octet 4, bits 5-7)
0 0 0   Cell Broadcast data coding scheme, GSM default alphabet, language unspecified, defined in 3GPP TS 23.038
0 0 1   USC2 (16 bit)
0 1 0   reserved
to
1 1 1
2 Character String (octet 6 to octet 7, inclusive; or octet 6 to octet 9, inclusive) Encoded according to the Coding Scheme defined by octet 4, bits 5-7. Taken together, the two upper case characters represent an ISO 3166-1 alpha-2 code as specified in ISO 3166-1.
CSE, Circuit Switched Emergency call (octet 7, bit 8 or octet 9, bit 8)
8
1 The call to be established is an emergency call
0 The call to be established is a basic call
Depending on the coding scheme, a Label character either encompasses 2 octets or 4 octets.
Length of URI's last emergency label (octet, bits 1 to 6)
Indicates the length in octets of the URI's last emergency label, if the value is not 0 and CCU is set to "The URN is a country specific URN" CSEU, Country Specific Emergency URN (bit 7)
7
1 The URN is a country specific URN
0 The URN is derived from the Emergency Service Category Value.

Other CNs

A UE attempting to use the services provided via non-5G CNs accessed via 3GPP access, often also registers with the CN. The UE registers by transmitting an NAS attach request message, an NAS tracking area updating request message or a NAS location area request updating message to the CN. NAS messages, part of protocols used to interact with a CN (e.g. the EPC network, 5G CN, or GPRS CN), may include at least one Information Element (IE). In response to the attach request message, the tracking area updating request message, or the location area request the UE may receive a list with one or more emergency numbers, associated categories, associated URNs, or:

an indication that a call to the number triggers emergency procedures on PS domain only; or an indication that a call to the number triggers basic procedures on CS domain.

While some existing CNs already provide some emergency information via NAS messages, the NAS messages could be extended to provide the missing, additional emergency information. The extension of an NAS message's content would be backwards compatible, while providing an evolution to 5G. Furthermore, extension would prevent duplication. It should be noted that NAS messages can only include a limited number of octets encoding information in general, including emergency information in particular.

When the UE receives emergency information from the mobility management network element (for example, MME, SGSN, evolved Packet Data Gateway (ePDG)) in response to a registration message (for example, an attach message, location area update message, tracking area update message, IKE, Extensible Authentication Protocol (EAP), amongst others) sent by the UE, the UE can use this information to find a match between a dialed number and an emergency number in the emergency information. Each emergency number, within the emergency information is associated with at least one of a circuit switched emergency (CSE) call indicator, Emergency Service Category Value, or country-specific emergency URN.

The UE may reconstruct the country-specific emergency URN from the received emergency information. For example, the last hostname of a country-specific emergency URN may have digits that are the same as the emergency number's digits or, the last hostname of a country-specific emergency URN may have characters that do not equate to the emergency number's digits.

Depending on the domain selected, the UE performs PS emergency call procedures or CS procedures. Depending on the value of the CSE, the CS procedures consist of CS emergency call procedures or CS basic call procedures. If the UE performs PS emergency call procedures, the UE includes the reconstructed country-specific emergency URN in a SIP INVITE message. If the UE performs CS emergency call procedures, the UE may include the Emergency Service Category Value in an EMERGENCY SETUP message. If the UE performs CS basic call procedures, the UE may include the dialed digits in a SETUP message.

Since existing registration response messages already include the Emergency Number List IE, it is proposed to extend the (NAS) registration response with the Emergency Information IE proposed. The Extended Number List IE may also be known as the Emergency Information IE.

DNS-Based Solution
Overall Procedure

While 5G is a newly defined system, other systems, for example systems supporting the EPC, are currently deployed. In 5G the emergency information can be provided as part of the NAS, but in the other systems, upgrading the MME and the UE's NAS as well as the UE's upper layers (which may comprise, for example, an IMS client) is not as straight-forward.

This solution is also applicable to CNs other than 5G CNs. The UE needs to obtain emergency information with one or more emergency numbers, associated categories, associated URNs, and/or:

an indication that a call to the number triggers emergency procedures on PS domain only; or
an indication that a call to the number triggers basic procedures on CS domain.

Any provisioning mechanism used to provide the list should preferably be easily deployable. For example, a DNS server can be used to obtain the list. A UE can query a DNS without impacting the NAS layer, for example. The UE may obtain, from a DNS server whose address is indicated by the PLMN's network, as DNS servers obtained from untrusted WLAN are considered untrusted DNS servers, a list of emergency information as described above. The list may contain hostnames. Some hostnames may represent emergency information, for example because of the presence of a label like the "sos" label. Some information in the emergency information may be one or more hostnames formatted as described in greater detail below.

This solution would at least partially prevent the situation where the UE doesn't detect that a dialed number is in the second set of emergency numbers.

If the UE receives an empty list, the UE may either replace a previously stored list with an empty list (i.e. remove/delete the current list) or the UE may ignore the empty list. If the UE receives no list, the UE may choose to not overwrite a previously received list. Replacing a previously received list with an empty list is useful when the UE registers with a PLMN in the same country as the HPLMN, and this PLMN handles all emergency call detection, beyond what is detected due to ME hard coded numbers and USIM provisioned numbers, in the network (e.g. by means of a SIP 380 response from the P-CSCF or, in the MSC, by routing the basic call request to a PSAP).

When using DNS to obtain this list, the UE may perform a DNS NAPTR query using an indicator by sending a DNS request to one or more previously configured DNS servers. The UE may, for example, send a string indicating that it wishes to receive a list of emergency information as described above. The string may be a domain name or FQDN. The DNS server may then respond with a DNS response message that may contain replacement records.

The replacement records, if present in the DNS response message, contain domain names (a domain name can be a set of dot separated host names or a set of dot separated labels) or FQDNs.

The Internet standards (Requests for Comments) for protocols mandate that component hostname labels may contain only the ASCII letters 'a' through 'z' (in a case-insensitive manner), the digits '0' through '9', and the hyphen ('-'). The original specification of hostnames in RFC 952, *"DoD Internet Host Table Specification"*, October 1985, mandated that labels could not start with a digit or with a hyphen, and must not end with a hyphen. However, a subsequent specification, RFC 1123, *"Requirements for Internet Hosts—Application and Support"*, October 1989, permitted hostname labels to start with digits. No other symbols, punctuation characters, or white space are permitted.

When mapping 5 bit category information to a valid host name or domain name's label, simply taking the first or last five bits of an ASCII or UTF-8 character could result in ASCII or UTF-8 characters that are not allowable in a hostname or label, according to the hostname requirement above. For example, hexadecimal 1B represents the ESC command in ASCII. Therefore, solutions are provided for this problem below.

The above DNS procedure can be used over any IP access that is provided by any access technology, including for example, WLAN, and it is not limited to LTE access or EPC nor NR access or SGCN, or the like.

As an alternative to a UE, a P-CSCF could interrogate a DNS server to obtain such information.

In all of the alternatives below, in order to ensure the constructed domain name is unique, and does not overlap another domain name already reserved for example through ICANN, a top-level domain name could be added. For example,
eservicecat.mnc<MNC>.mcc<MCC>.pub.3gppnetwork.org, where <MNC> and <MCC> are the E.212 Mobile Network Code and Mobile Country Code of the PLMN providing the IMS PDN, which is either the HPLMN or the VPLMN, dependent upon whether Local BreakOut (LBO) or home-based routing (S8HR) roaming is used).

Alternatively, the following domain name could be considered "sos.en.cn.mcc<MCC>.pub.3gppnetwork.org". The top-level domain name to append to the constructed domain name could be static, well known, pre-provisioned or hard coded, or could be provisioned in the UE at time of SIP registration (for example, received in a SIP response to a SIP INVITE request) or at PDN connection set-up, for example using the PCO IE in NAS messaging, using DHCP, using Open Mobile Alliance (OMA) Device Management (DM), amongst others. Alternatively, the UE could derive the top-level domain name to append to the constructed domain name from a configured IMS home network domain name, as described in 3GPP TS 23.003, *"Numbering, addressing, and identification"*, v. 15.2.0, December 2017, and insert the label "pub" before the labels "3gppnetwork.org" in order to ensure the UE can derive the resultant domain name or FQDN.

Note: if a P-CSCF rather than a UE is initiating the DNS request, the insertion of the label ".pub" is unnecessary.

Mapping 5-Bit Service Categories to and from Domain Names or FQDNs

Alternative 1

In one embodiment, each bit that is "on" or "set" could be mapped to a letter, as shown by the example of Table 2 below. A bit that is not set or "off" could be mapped to another valid hostname character, for example to 'z' or '0' (zero) or co' or Mapping to a letter may be preferred for DNS servers not permitting a hostname to start with a digit or a dash.

TABLE 2

Example mapping of bits to letters

| Bit | Emergency service | Letter |
|---|---|---|
| 1 | Police | 'p' |
| 2 | Ambulance | 'a' |
| 3 | Fire Brigade | 'f' |
| 4 | Marine Guard | 'g' |
| 5 | Mountain Rescue | 'r' |

Alternatively, the hostname could start with some predefined characters, for example "cat". For example, if the 5-bit service category is '01100', the hostname might be "cat0af00", or, when reading right to left, "cat00af0".

Instead of mapping to a letter such as 'p', 'a', 'f', 'g', or 'r', each bit that is "on" or "set" could be mapped to a digit. Using the same example of 5-bits '01100', the mapped hostname could be "cat01100", or when reading right to left, "cat00110".

Alternative 2

The service category can be described in digits, for example, hexadecimals or decimals. Currently, $2^5=32$ service category values exist. Any digits between and including [0-31] would represent a valid service category. In hexadecimals, any hexadecimals between and including [0-1F] would represent a valid service category. For example, a service category value with the bits representing "Ambulance" and "Fire Brigade" set could be represented by "06", or "cat06".

Alternative 3

Alternative 3 is combined with alternative 1 or alternative 2 and improves these alternatives as follows.

In order to indicate that a call on the CS domain should be performed using basic procedures, the predefined characters could be followed by an empty string, e.g.: "cat".

On the other hand, "e" or "ec" or "ecsc" could be considered an alternative set of predefined characters, representing "emergency", "emergency call" or "emergency CS call", respectively. If the network wishes to indicate that the call on the CS domain should be performed using basic call procedures (i.e. not emergency call procedures), the predefined characters could be "c" or "csc". While "e" or "ec" or "ecsc" would be followed with a category representation (see e.g. alternative 1 or alternative 2), "c" or "csc" would not be followed by a category representation.

Therefore, using the examples above and where the (<MNC> or) <MCC> of the network providing the IMS PDN are for example 15 and 234, respectively, the following URNs categories would be transposed into the associated domain names or FQDNs. It should be noted that this list is for illustrative purposes only and is not intended to be an exhaustive list of all possibilities.

cat0af00.eservicecat.mnc015.mcc234.pub.3gppnetwork.org cat00af0.eservicecat.mnc015.mcc234.pub.3gppnetwork.org cat01100.eservicecat.mnc015.mcc234.pub.3gppnetwork.org cat00110.eservicecat.mnc015.mcc234.pub.3gppnetwork.org 06.eservicecat.mnc015.mcc234.pub.3gppnetwork.org cat06.eservicecat.mnc015.mcc234.pub.3gppnetwork.org Mapping Emergency URNs to and from Domain Names or FQDNs Two emergency URN sets exist.

a first emergency URN set: "urn:service:sos", "urn:service:sos.police", "urn:service:sos.ambulance", "urn:service:sos.fire", "urn:service:sos.marine", and "urn:service:sos.mountain"; and a second emergency URN set consisting of other URNs, known as Country specific emergency service URNs.

By dropping the prefix text of "urn:service:" from the URNs in the sets as defined above, and then reversing order of the remaining hostname labels, a domain name or FQDN can be constructed. However, in order to ensure the constructed domain name is unique and does not overlap another domain name already reserved, for example through ICANN, a top-level domain name could be added. For example, a URN could be constructed such as service.urn.mnc<MNC>.mcc<MCC>.pub.3gppnetwork.org, where <MNC> and <MCC> are the E.212 Mobile Network Code and Mobile Country Code of the PLMN providing the IMS PDN, which could be either the HPLMN or the VPLMN, dependent upon whether LBO or S8HR roaming is used.

Alternatively, the following domain name could be considered "sos.en.cn.mcc<MCC>.pub.3gppnetwork.org". The top-level domain name to append to the constructed domain name could be static, well known, pre-provisioned or hard coded or could be provisioned in the UE at time of SIP registration, for example received in a SIP response to a SIP INVITE request, or at PDN connection set-up, for example using the PCO IE in NAS messaging, using DHCP, using OMA DM, amongst others. Alternatively, the UE could derive the top-level domain name to append to the constructed domain name from a configured IMS home network domain name, as described in 3GPP TS 23.003, and insert the label "pub" before the labels "3gppnetwork.org" in order to ensure the UE can derive the resultant domain name or FQDN.

Note: if a P-CSCF rather than a UE is initiating the DNS request, the insertion of the label ".pub" is unnecessary.

Therefore, using the examples above and where the <MNC> and <MCC> of the network providing the IMS PDN are 15 and 234, respectively, the following URNs would be transposed into the associated domain names or FQDNs:

sos.service.urn.mnc015.mcc234.pub.3gppnetwork.org
    police.sos
        service.urn.mnc015.mcc234.pub.3gppnetwork.org
    ambulance.sos
        service.urn.mnc015.mcc234.pub.3gppnetwork.org
    fire.sos.service.urn.mnc015.mcc234.pub.3gppnetwork.org
    marine.sos.service.urn.mnc015.mcc234.pub.3gppnetwork.org
    mountain.sos.service.urn.mnc015.mcc234.pub.3gpp- network.org The above may correspond to the following text to be added to 3GPP TS 23.003.

---

When a UE is registered with the core network via an IP-CAN, the UE uses DNS mechanisms to retrieve emergency call numbers, and associated service categories or service types for use within the country indicated by the MCC information.
NOTE:
The obtained emergency call numbers may include numbers for which no service category has been reserved.
The UE shall construct an emergency number FQDN based on the Emergency Numbers FQDN format as specified in 3GPP TS 23.003 and then perform the DNS NAPTR query using the constructed FQDN as input.
If the result of this query is:
a set of one or more records containing the replacement field of the form "<ps-emergency-type>.<cs-emergency >.<emergency-number>.sos.en.cn.mcc<MCC>.pub.3gppnework.org", the UE shall consider the list of emergency-number(s), category(ies) and type(s) as valid additional emergency call number(s) for the country indicated by the MCC information and store the emergency call number(s) and type(s) received; no records containing the replacement field of the form "<ps-emergency-type>.<cs-emergency >.<emergency-number>.sos.en.cn.mcc<MCC>.pub.3gppnework.org", the UE shall replace a Local Emergency Numbers List storing emergency call number(s) and type(s) received over WLAN with an empty Local Emergency Numbers List.

---

Alternatively, the replacement forms above could include the label named "visited-country", i.e.: <ps-emergency-type>.<cs-emergency >.<emergency-number>.sos.en.cn.mcc<MCC>.visited-country.pub.3gppnework.org.

The "emergency number FQDN based on the Emergency Numbers FQDN format as specified in 3GPP TS 23.003", referred to above may be based on adding sections to 3GPP TS 23.003 as provided in FIGS. 11A and 11B, where the table in FIG. 11B flows from the table in FIG. 11A.

When a UE receives e.g. "sos.ambulance.cs.15.sos.en.cn.mcc345.pub.3gppnetwork.org" or "sos.police.ecs00001.17.sos.en.cn.mcc345.pub.3gppnetwork.org" and it detects a dialed number matching:

15: the UE can derive from
    "sos.ambulance.cs.15.sos.en.cn.mcc345.pub.3gppnetwork.org" that numbed 15 matches the "emergency-number" portion. Further, the value of the "cs-emergency" portion is "CS". The value "CS" indicates that the UE must perform CS basic call procedures if the UE selects the CS domain to make the call. The value of "ps-emergency-type" portion is "sos.ambulance". The value "sos.ambulance" indicates that the UE must include a constructed URN in the SIP INVITE if the UE selects the PS domain to make the call or emergency session. The UE constructs a URN by prepending "urn:service:" to the value, resulting in the constructed URN "urn:service:sos.ambulance".

17: the UE can derive from
    "sos.police.ecs00100.17.sos.en.cn.mcc345.pub.3gppnetwork.org" that numbed 17 matches the "emergency-number" portion (see Table 19.4.2.9A.x-1). Further, the value of the "cs-emergency" portion is "ecs00001". The value "ecs00001" indicates that the UE must make perform CS emergency call procedures if the UE selects the CS domain to make the call. The UE must set the category in the EMERGENCY SETUP message, and the UE only sets the bit representing "police" (i.e. the first bit). The value of "ps-emergency-type" portion is "sos.police". The value "sos.police" indicates that the UE must include a constructed URN in the SIP INVITE if the UE selects the PS domain to make the call or emergency session. The UE constructs a URN by prepending "urn:service:" to the value, resulting in the constructed URN "urn:service:sos.police".

In embodiments with hexadecimal encoding, the above can be modified as shown in FIG. 12.

When a UE receives e.g. "sos.ambulance.cs.15.sos.en.cn.mcc345.pub.3gppnetwork.org" or "sos.police.ecs00001.17.sos.en.cn.mcc345.pub.3gppnetwork.org" and it detects a dialed number matching:

15: the UE can derive from
    "sos.ambulance.cs.15.sos.en.cn.mcc345.pub.3gppnetwork.org" that numbed 15 matches the "emergency-number" portion (see Table 19.4.2.9A.x-1). Further, the value of the "cs-emergency" portion is "CS". The value "CS" indicates that the UE must perform CS basic call procedures if the UE selects the CS domain to make the call. The value of "ps-emergency-type" portion is "sos.ambulance". The value "sos.ambulance" indicates that the UE must include a constructed URN in the SIP INVITE if the UE selects the PS domain to make the call or emergency session. The UE constructs a URN by prepending "urn:service:" to the value, resulting in the constructed URN "urn:service:sos.ambulance".

17: the UE can derive from
    "sos.police.ecs00100.17.sos.en.cn.mcc345.pub.3gppnetwork.org" that numbed 17 matches the "emergency-number" portion (see Table 19.4.2.9A.x-1). Further, the value of the "cs-emergency" portion is "ecs01". The value "ecs01" indicates that the UE must make perform CS emergency call procedures if the UE selects the CS domain to make the call. Hexadecimal value 01 represents value 00001 in 5 bits. The UE must set the 5-bit category in the EMERGENCY SETUP message, and the UE only sets the bit representing "police" (i.e. the first bit). The value of "ps-emergency-type" portion is "sos.police". The value "sos.police" indicates that the UE must include a constructed URN in the SIP INVITE if the UE selects the PS domain to make the call or emergency session. The UE constructs a URN by prepending "urn:service:" to the value, resulting in the constructed URN "urn:service:sos.police".

Some embodiments of the present disclosure may be described with reference to the following non limiting clauses.

1. A UE:
    obtaining emergency information, the emergency information including an emergency number and at least one of information to initiate a call on a CS domain, information to initiate an emergency session on a PS domain;
    matching the emergency number with one or more first digits, wherein the emergency number consists of one or more second digits.

2. Item 1, wherein the call on the CS domain comprises at least one of a basic call or an emergency call.
3. Item 1, wherein information to initiate the emergency session on the PS domain comprises information to construct a URN.
3a. Item 3, wherein the URN includes a label set to "sos".
4. Item 2, wherein information to initiate the emergency call on the CS domain comprises information to construct a 5-bit service category.
5. Item 2, wherein information to initiate the emergency call on the CS domain comprises a 5-bit service category.
6. Item 2, wherein information to initiate the basic call on the CS domain comprises insufficient information to construct a 5-bit service category.
7. Item 2, wherein information to initiate the basic call on the CS domain comprises an indicator indicating the UE to initiate a basic call on the CS domain.
8. Item 2, wherein information to initiate the basic call on the CS domain comprises an indication that emergency procedures are only applicable on the PS domain.
9. Item 2, wherein information to initiate the basic call on the CS domain comprises an indication that the one or more first digits are included in a CS SETUP message, if the emergency number matches the one or more first digits.
10. Item 1, wherein the emergency number and at least one of information are associated.
11. Item 3, wherein the URN is included in SIP INVITE message, if the emergency number matches the one or more first digits.
12. Item 3, wherein the URN includes a label equal to the emergency number, if a length field is set to zero.
13. Item 3, wherein the URN includes a label equal to the emergency number, if an indicator indicates the URN is a country specific URN.
13a. Item 3, wherein an indicator indicates the URN is a country specific URN.
13. Item 3, wherein an indicator indicates the URN is one of "urn:service:sos", "urn:service:sos.police", "urn:service:sos.ambulance", "urn:service:sos.fire", "urn:service:sos.marine", "urn:service:sos.mountain".
13a. Item 13, wherein the one of "urn:service:sos", "urn:service:sos.police", "urn:service:sos.ambulance", "urn:service:sos.fire", "urn:service:sos.marine", "urn:service:sos.mountain" is derived from a 5-bit service category.
A. A network element, the network element:
   providing emergency information, the emergency information including an emergency number and at least one of information to initiate a call on a CS domain, information to initiate an emergency session on a PS domain.
AA. A system comprising the network element of item A and the UE of item 1.
B. A network element in a first PLMN, the network element:
   obtaining emergency information for a second PLMN, the emergency information including an emergency number and at least one of information to initiate a call on a CS domain, information to initiate an emergency session on a PS domain;
   the emergency information applicable when receiving a SIP INVITE from a UE via the second PLMN.
B1. Item B, wherein the emergency information further indicates "emergency registration".
B2. Item B, wherein the emergency information further indicates "anonymous-emergencycall".

One example user equipment that may be used to implement the present disclosure is described below with regard to FIG. 4.

User equipment 400 may comprise a two-way wireless communication device having voice or data communication capabilities or both. User equipment 400 generally has the capability to communicate with other computer systems. Depending on the exact functionality provided, the user equipment may be referred to as a data messaging device, a two-way pager, a wireless e-mail device, a smartphone, a cellular telephone with data messaging capabilities, a wireless Internet appliance, a wireless device, a mobile device, an embedded cellular modem or a data communication device, as examples.

Where user equipment 400 is enabled for two-way communication, it may incorporate a communication subsystem 411, including a receiver 412 and a transmitter 414, as well as associated components such as one or more antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the user equipment is intended to operate.

Network access requirements will also vary depending upon the type of network 419. In some networks, network access is associated with a subscriber or user of the user equipment 400. A user equipment may require an embedded or a removable user identity module (RUIM) or a subscriber identity module (SIM) card or a UMTS SIM (USIM) in order to operate on a network. The USIM/SIM/RUIM interface 444 is normally similar to a card-slot into which a USIM/SIM/RUIM card can be inserted and ejected. The USIM/SIM/RUIM card can have memory and hold many key configurations 451, and other information 453 such as identification, and subscriber related information. In other cases, rather than a network 419, user equipment 400 may communicate with a non-access node, such as a vehicle, roadside infrastructure, another user equipment, or other peer-to-peer communication.

When required network registration or activation procedures have been completed, user equipment 400 may send and receive communication signals over the network 419. As illustrated in FIG. 4, network 419 can include multiple base stations communicating with the mobile device.

Signals received by antenna 416 through communication network 419 are input to receiver 412, which may perform such common receiver functions as signal amplification, frequency down conversion, filtering, channel selection and the like. Analog to digital (A/D) conversion of a received signal allows more complex communication functions such as demodulation and decoding to be performed in the DSP 410. In a similar manner, signals to be transmitted are processed, including modulation and encoding for example, by DSP 420 and input to transmitter 414 for digital to analog (D/A) conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

User equipment 400 generally includes a processor 438 which controls the overall operation of the device. Communication functions, including data and voice communications, are performed through communication subsystem 411. Processor 438 also interacts with further device subsystems such as the display 422, flash memory 424, random access memory (RAM) 426, auxiliary input/output (I/O) subsystems 428, serial port 430, one or more keyboards or keypads 432, speaker 434, microphone 436, other communication subsystem 440 such as a short-range communications subsystem or DSRC subsystem, and any other device subsystems generally designated as 442. Serial port 430 could include a USB port, On-Board Diagnostics (OBD) port or other port known to those in the art.

Figure 4:
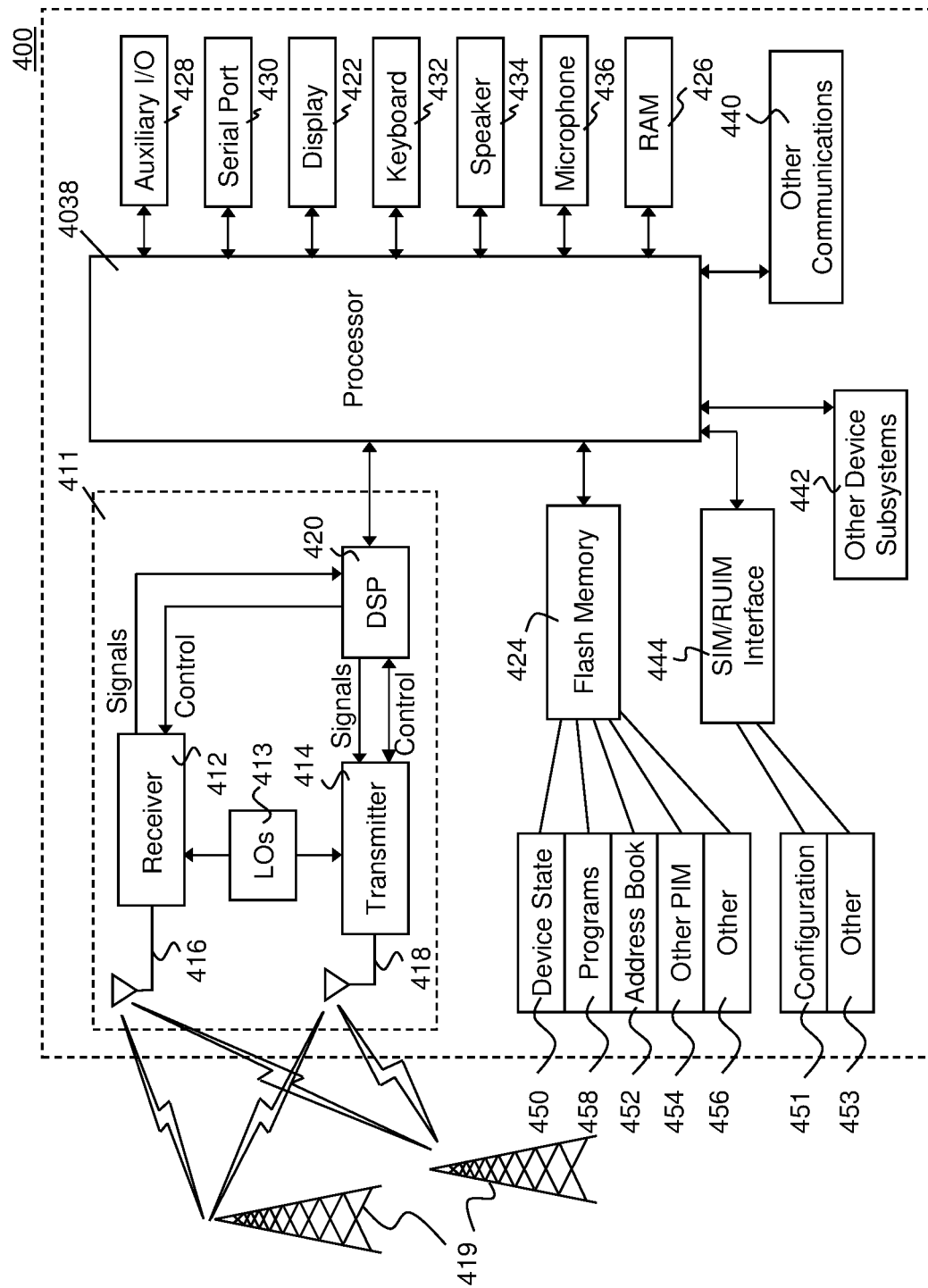
FIG. 4 is a conceptual diagram of a user equipment in accordance with at least some embodiments of the present disclosure.

Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the processor 438 may be stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Processor 438, in addition to its operating system functions, may enable execution of software applications on the user equipment. A predetermined set of applications that control basic operations, including potentially data and voice communication applications for example, will normally be installed on user equipment 400 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the user equipment such as, but not limited to, e-mail, messages, calendar events, voice mails, appointments, and task items. Further applications, including productivity applications, social media applications, games, among others, may also be loaded onto the user equipment 400 through the network 419, an auxiliary I/O subsystem 428, serial port 430, short-range communications subsystem 440 or any other suitable subsystem 442, and installed by a user in the RAM 426 or a non-volatile store (not shown) for execution by the processor 438. Such flexibility in application installation increases the functionality of the device and may provide enhanced on-device functions, communication-related functions, or both.

In a data communication mode, a received signal such as a text message or web page download will be processed by the communication subsystem 411 and input to the processor 438, which may further process the received signal for output to the display 422, or alternatively to an auxiliary I/O device 428.

A user of user equipment 400 may also compose data items such as messages for example, using the keyboard 432, which may be a complete alphanumeric keyboard or telephone-type keypad, either physical or virtual, among others, in conjunction with the display 422 and possibly an auxiliary I/O device 428. Such composed items may then be transmitted over a communication network through the communication subsystem 411.

Where voice communications are provided, overall operation of user equipment 400 is similar, except that received signals may typically be output to a speaker 434 and signals for transmission may be generated by a microphone 436. Alternative voice or audio I/O subsystems, such as a voice message recording subsystem, may also be implemented on user equipment 400. Although voice or audio signal output is preferably accomplished primarily through the speaker 434, display 422 may also be used to provide an indication of the identity of a calling party, the duration of a voice call, or other voice call related information for example.

Serial port 430 in FIG. 4 may be implemented in a user equipment for which synchronization with a user's desktop computer (not shown) may be desirable, but is an optional device component. Such a port 430 may enable a user to set preferences through an external device or software application and may extend the capabilities of user equipment 400 by providing for information or software downloads to user equipment 400 other than through a wireless communication network. As will be appreciated by those skilled in the art, serial port 430 can further be used to connect the user equipment to a computer to act as a modem or for charging a battery on the user equipment.

Other communications subsystems 440, such as a short-range communications subsystem, is a further component which may provide for communication between user equipment 400 and different systems or devices, which need not necessarily be similar devices. For example, the subsystem 440 may include an infrared device and associated circuits and components or a Bluetooth™ or Bluetooth™ Low Energy communication module to provide for communication with similarly enabled systems and devices. Subsystem 440 may further include a WUR radio. Subsystem 440 may further include a DSRC radio. Subsystem 440 may further include non-cellular communications such as Wi-Fi or WiMAX, or near field communications, and in accordance with the embodiments above such radio may be capable of being split in some circumstances.

The network elements described above can use any computing device or combination of computing devices. One example computing device is shown with regards to FIG. 5. Network element 510 includes a processor 520 and a communications subsystem 530, where the processor 520 and communications subsystem 530 cooperate to perform the methods of the embodiments described herein.

Figure 5:
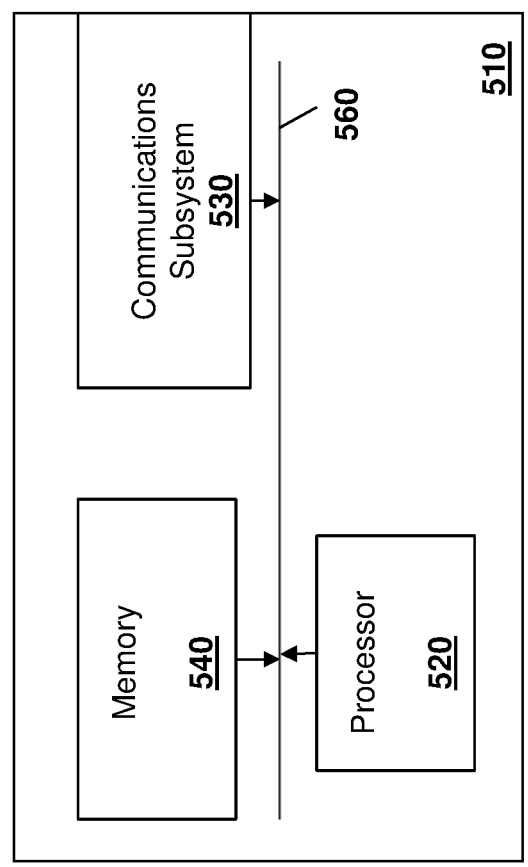
FIG. 5 is a conceptual diagram of a network element in accordance with at least some embodiments of the present disclosure.

Processor 520 is configured to execute programmable logic, which may be stored, along with data, on network element 510, and shown in the example of FIG. 5 as memory 540. Memory 540 can be any tangible, non-transitory computer readable storage medium, such as optical (e.g., CD, DVD, etc.), magnetic (e.g., tape), flash drive, hard drive, or other memory known in the art.

Alternatively, or in addition to memory 540, server 510 may access data or programmable logic from an external storage medium, for example through communications subsystem 530.

Communications subsystem 530 allows server 510 to communicate with other devices or network elements.

Communications between the various elements of server 510 may be through an internal bus 560 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above.

What is claimed is:

1. A method by a User Equipment (UE) for using emergency information, comprising:
transmitting a request message as part of a Network Access Stratum (NAS) procedure; receiving, in response to the request message, a response message comprising a list including at least one emergency number;
determining that a dialed number matches the at least one emergency number;
upon determining that the dialed number matches the at least one emergency number, selecting a domain to perform a call setup procedure;
when the selected domain is a Packet Switched (PS) domain, performing an emergency call setup procedure; and
when the selected domain is a Circuit Switched (CS) domain, performing a basic call setup procedure depending on the emergency information.

2. The method of claim 1, wherein the emergency information includes a first information element (IE), the first IE comprising a list.

3. The method of claim 2, wherein the first IE does not include a category for the at least one emergency number.

4. The method of claim 2, wherein the emergency information includes a second IE comprising an Emergency Number List IE, wherein the first IE and the second IE are different.

5. The method of claim 4, wherein the second IE comprises a category.

6. The method of claim 1, wherein the NAS procedure comprises at least one of an attachment procedure, a tracking area update procedure, and a registration procedure.

7. The method of claim 1, wherein the request message is at least one of a registration request to register, a request to update location information, or a request to update tracking area information.

8. The method of claim 1, wherein the basic call setup procedure comprises sending a SETUP message with the emergency number.

9. The method of claim 2, wherein the list comprises, for each of the at least one emergency number, information from which to derive an emergency Universal Resource Name (URN).

10. The method of claim 9, wherein the emergency call setup procedure comprises sending an INVITE message with the emergency URN.

11. The method of claim 1, wherein the NAS procedure comprises a procedure with a mobility management network element.

* * * * *